US012724272B2

(12) United States Patent
Lin et al.

(10) Patent No.: US 12,724,272 B2
(45) Date of Patent: Sep. 1, 2026

(54) METASURFACES WITH ASYMETRIC GRATINGS FOR REDIRECTING LIGHT AND METHODS FOR FABRICATING

(71) Applicant: Magic Leap, Inc., Plantation, FL (US)

(72) Inventors: Dianmin Lin, Los Altos, CA (US); Mauro Melli, San Leandro, CA (US); Pierre St. Hilaire, Belmont, CA (US); Christophe Peroz, Tokyo (JP); Evgeni Poliakov, Oakland, CA (US)

(73) Assignee: Magic Leap, Inc., Plantation, FL (US)

( * ) Notice: Subject to any disclaimer, the term of this patent is extended or adjusted under 35 U.S.C. 154(b) by 346 days.

(21) Appl. No.: 18/463,671

(22) Filed: Sep. 8, 2023

(65) Prior Publication Data

US 2023/0418074 A1 Dec. 28, 2023

Related U.S. Application Data

(60) Continuation of application No. 17/749,838, filed on May 20, 2022, now Pat. No. 11,796,818, which is a (Continued)

(51) Int. Cl.
*G02B 27/01* (2006.01)
*G02B 5/18* (2006.01)

(Continued)

(52) U.S. Cl.
CPC ........... *G02B 27/0172* (2013.01); *G02B 5/30* (2013.01); *G02B 30/35* (2020.01); *H04N 13/344* (2018.05);

(Continued)

(58) Field of Classification Search
None
See application file for complete search history.

(56) References Cited

U.S. PATENT DOCUMENTS 4,322,125 A 3/1982 Warren
4,839,464 A 6/1989 McCarthy et al.

(Continued)

FOREIGN PATENT DOCUMENTS

CN 101177237 A 5/2008
CN 102073103 A 5/2011

(Continued)

OTHER PUBLICATIONS

Aieta, F. et al., "Multiwavelength achromatic metasurfaces by dispersive phase compensation," Science, vol. 347, Issue 6228, Mar. 20, 2015, in 5 pages. URL: www.sciencemag.org.

(Continued)

*Primary Examiner* — Ryan Crockett
(74) *Attorney, Agent, or Firm* — Zi Y. Wong; Via LLP

(57) ABSTRACT

An optical system comprises an optically transmissive substrate comprising a multilevel metasurface which comprises a grating comprising a plurality of multilevel unit cells. Each unit cell comprises, on a lowermost level, a laterally-elongated first lowermost level nanobeam having a first width and a laterally-elongated second lowermost level nanobeam having a second width larger than the first width. Each unit cell further comprises, on an uppermost level, a laterally-elongated first uppermost level nanobeam above the first lowermost level nanobeam and a laterally-elongated second uppermost level nanobeam above the second lowermost level nanobeam.

15 Claims, 27 Drawing Sheets

Related U.S. Application Data continuation of application No. 16/733,168, filed on Jan. 2, 2020, now Pat. No. 11,360,306, which is a division of application No. 15/588,350, filed on May 5, 2017, now Pat. No. 10,527,851.

(60) Provisional application No. 62/474,432, filed on Mar. 21, 2017, provisional application No. 62/333,067, filed on May 6, 2016.

(51) Int. Cl.
*G02B 5/30* (2006.01)
*G02B 30/35* (2020.01)
*H04N 13/344* (2018.01)
*H04N 13/349* (2018.01)

(52) U.S. Cl.
CPC ... *H04N 13/349* (2018.05); *G02B 2005/1804* (2013.01); *G02B 2027/0109* (2013.01); *G02B 2027/0125* (2013.01); *G02B 2027/0174* (2013.01)

(56) References Cited

U.S. PATENT DOCUMENTS 5,336,073 A 8/1994 Hiraoka
6,122,103 A 9/2000 Perkins et al.
6,850,221 B1 2/2005 Tickle
D514,570 S 2/2006 Ohta
7,206,107 B2 4/2007 Levola
7,542,209 B2 6/2009 Mcguire, Jr. et al.
7,570,424 B2 8/2009 Perkins et al.
7,573,640 B2 8/2009 Nivon et al.
7,905,650 B2 3/2011 Ma et al.
7,991,257 B1 8/2011 Coleman
8,047,653 B2 11/2011 Akahane et al.
8,467,643 B2 6/2013 Iizuka et al.
8,917,447 B2 12/2014 Wolk et al.
8,950,867 B2 2/2015 Macnamara
9,081,426 B2 7/2015 Armstrong
9,116,302 B2 8/2015 Mccarthy et al.
9,176,065 B2 * 11/2015 Bond .................... B82Y 20/00
9,188,717 B2 11/2015 Nishiwaki
9,215,293 B2 12/2015 Miller
D752,529 S 3/2016 Loretan et al.
9,310,559 B2 4/2016 Macnamara
9,348,143 B2 5/2016 Gao et al.
D758,367 S 6/2016 Natsume
D759,657 S 6/2016 Kujawski et al.
9,417,452 B2 8/2016 Schowengerdt et al.
9,419,249 B2 8/2016 Yamaguchi et al.
9,470,906 B2 10/2016 Kaji et al.
9,547,174 B2 1/2017 Gao et al.
9,625,717 B2 4/2017 Sunnari et al.
9,671,566 B2 6/2017 Abovitz et al.
D794,288 S 8/2017 Beers et al.
9,740,006 B2 8/2017 Gao
9,791,700 B2 10/2017 Schowengerdt
9,799,853 B2 10/2017 Lamansky et al.
9,823,392 B2 11/2017 Masuyama et al.
D805,734 S 12/2017 Fisher et al.
9,851,563 B2 12/2017 Gao et al.
9,857,591 B2 1/2018 Welch et al.
9,874,749 B2 1/2018 Bradski et al.
9,887,459 B2 2/2018 Casciato et al.
9,995,859 B2 6/2018 Kamali et al.
10,254,454 B2 4/2019 Klug et al.
10,409,059 B2 9/2019 Mason et al.
10,466,394 B2 11/2019 Lin et al.
10,527,851 B2 1/2020 Lin et al.
10,690,826 B2 6/2020 Klug et al.
11,211,544 B2 12/2021 Ubachs et al.
11,231,544 B2 1/2022 Lin et al.
11,243,338 B2 2/2022 Lin et al.
11,360,306 B2 6/2022 Lin et al.
11,366,296 B2 6/2022 Devlin et al.
11,796,818 B2 10/2023 Lin
11,886,000 B2 * 1/2024 Peroz .................. G02B 6/0036
2002/0155699 A1 10/2002 Ueda
2004/0047039 A1 3/2004 Wang et al.
2004/0233534 A1 11/2004 Nakanishi et al.
2004/0263981 A1 12/2004 Coleman
2005/0161589 A1 * 7/2005 Kim .................. G02B 27/0944 250/216
2006/0028436 A1 2/2006 Armstrong
2006/0056166 A1 3/2006 Yeo et al.
2006/0120662 A1 6/2006 Tabuchi
2006/0126179 A1 * 6/2006 Levola .............. G02B 27/4277 359/563
2006/0126699 A1 6/2006 Kaneda
2006/0154044 A1 7/2006 Yamada et al.
2006/0240232 A1 10/2006 Faris
2007/0081123 A1 4/2007 Lewis
2007/0188837 A1 8/2007 Shimizu et al.
2007/0211337 A1 9/2007 Himel et al.
2007/0229955 A1 10/2007 Kawamura et al.
2008/0043302 A1 2/2008 Park et al.
2008/0049419 A1 2/2008 Ma et al.
2008/0176041 A1 7/2008 Sato et al.
2008/0225391 A1 9/2008 Walter et al.
2008/0278811 A1 11/2008 Perkins et al.
2009/0087794 A1 4/2009 Sekikawa et al.
2009/0154871 A1 6/2009 Pyo et al.
2009/0184297 A1 7/2009 Moriyama et al.
2010/0039707 A1 2/2010 Akahane et al.
2010/0054662 A1 3/2010 Hofrichter et al.
2010/0157400 A1 6/2010 Dimov et al.
2010/0177388 A1 * 7/2010 Cohen ................. G02B 6/0038 359/566
2010/0232017 A1 9/2010 McCarthy et al.
2011/0069727 A1 3/2011 Reid et al.
2011/0141541 A1 6/2011 Bratkovski
2011/0141873 A1 6/2011 Miyasaka et al.
2011/0166045 A1 * 7/2011 Dhawan ................ B82Y 15/00 257/467
2011/0170184 A1 7/2011 Wolk
2011/0268145 A1 * 11/2011 Kikuta .............. G02B 27/4272 372/106
2011/0315988 A1 12/2011 Yu et al.
2012/0013989 A1 1/2012 Choi et al.
2012/0099817 A1 4/2012 Quan et al.
2012/0120493 A1 5/2012 Simmonds et al.
2012/0127062 A1 5/2012 Bar-Zeev et al.
2012/0162549 A1 6/2012 Gao et al.
2012/0169966 A1 7/2012 Lu
2013/0082922 A1 4/2013 Miller
2013/0100362 A1 * 4/2013 Saeedi ................ G02B 27/017 359/214.1
2013/0105438 A1 5/2013 Zhu et al.
2013/0117377 A1 5/2013 Miller
2013/0125027 A1 5/2013 Abovitz
2013/0176554 A1 7/2013 Loncar et al.
2013/0208234 A1 8/2013 Lewis
2013/0208332 A1 8/2013 Yu et al.
2013/0242262 A1 9/2013 Lewis
2013/0264470 A1 10/2013 Nishiwaki
2014/0063585 A1 3/2014 Hagoplan et al.
2014/0064655 A1 3/2014 Nguyen et al.
2014/0071539 A1 3/2014 Gao
2014/0140653 A1 5/2014 Brown et al.
2014/0146390 A1 5/2014 Kaempfe et al.
2014/0167022 A1 6/2014 Huh et al.
2014/0177023 A1 6/2014 Gao et al.
2014/0204438 A1 7/2014 Yamada et al.
2014/0218468 A1 8/2014 Gao et al.
2014/0233126 A1 * 8/2014 Ye .......................... G02B 5/26 359/885
2014/0264998 A1 9/2014 Smith et al.
2014/0267420 A1 9/2014 Schowengerdt et al.
2014/0272295 A1 9/2014 Deshpande et al.
2014/0306866 A1 10/2014 Miller et al.
2014/0333926 A1 11/2014 Bond et al.
2015/0016777 A1 1/2015 Abovitz et al.
2015/0040978 A1 2/2015 Shalaev et al.

(56) References Cited

U.S. PATENT DOCUMENTS

2015/0076468 A1 3/2015 Yamaguchi et al.
2015/0086163 A1 3/2015 Valera et al.
2015/0103306 A1 4/2015 Kaji et al.
2015/0116721 A1 4/2015 Kats et al.
2015/0167921 A1 6/2015 Gollier et al.
2015/0178939 A1* 6/2015 Bradski .................. H04N 13/00 345/633
2015/0185413 A1 7/2015 Greiner et al.
2015/0205034 A1 7/2015 Fäcke et al.
2015/0205126 A1 7/2015 Schowengerdt
2015/0219806 A1 8/2015 Arbabi et al.
2015/0219807 A1 8/2015 Lochbihler
2015/0219842 A1 8/2015 Sqalli et al.
2015/0222883 A1 8/2015 Welch
2015/0222884 A1 8/2015 Cheng
2015/0253570 A1 9/2015 Sunnari et al.
2015/0268415 A1 9/2015 Schowengerdt et al.
2015/0277117 A1 10/2015 Yamada et al.
2015/0302652 A1 10/2015 Miller et al.
2015/0309263 A2 10/2015 Abovitz et al.
2015/0326570 A1 11/2015 Publicover et al.
2015/0346490 A1 12/2015 TeKolste et al.
2015/0346495 A1 12/2015 Welch et al.
2016/0011419 A1 1/2016 Gao
2016/0025626 A1 1/2016 Fegadolli et al.
2016/0025914 A1 1/2016 Brongersma et al.
2016/0026253 A1 1/2016 Bradski et al.
2016/0061993 A1 3/2016 Ren et al.
2016/0064679 A1 3/2016 Ajiki et al.
2016/0077261 A1 3/2016 Arbabi et al.
2016/0110920 A1 4/2016 Schowengerdt
2016/0154044 A1 6/2016 Bertness
2016/0306079 A1 10/2016 Arbabi et al.
2016/0320531 A1 11/2016 Kamali et al.
2017/0001616 A1 1/2017 Kwon et al.
2017/0010466 A1 1/2017 Klug et al.
2017/0010488 A1 1/2017 Klug et al.
2017/0030773 A1 2/2017 Han
2017/0031096 A1 2/2017 Yamaguchi et al.
2017/0131460 A1 5/2017 Lin et al.
2017/0235144 A1 8/2017 Piskunov et al.
2017/0322418 A1* 11/2017 Lin .......................... G02B 5/30
2018/0045953 A1* 2/2018 Fan .......................... G02B 5/18
2018/0113310 A1 4/2018 Rolland et al.
2018/0156949 A1 6/2018 Tsai et al.
2018/0217395 A1 8/2018 Lin et al.
2018/0231702 A1* 8/2018 Lin ...................... G02B 6/0011
2018/0284428 A1* 10/2018 Guenter ................. H04N 23/57
2018/0341090 A1 11/2018 Devlin et al.
2019/0206136 A1 7/2019 West et al.
2020/0072668 A1 3/2020 Han et al.
2020/0135703 A1 4/2020 Ahmed et al.
2020/0142110 A1 5/2020 Lin et al.
2020/0150437 A1 5/2020 Lin et al.
2020/0333609 A1 10/2020 Leister et al.
2022/0155502 A1 5/2022 Melli et al.
2022/0283438 A1 9/2022 Lin
2022/0365482 A1* 11/2022 Yu ........................ G03H 1/0248
2023/0244083 A1* 8/2023 Messer ................... G06F 3/013

FOREIGN PATENT DOCUMENTS

CN 101556356 A 10/2011
CN 104659179 A 5/2015
JP S60140204 A 7/1985
JP S6286307 A 4/1987
JP H0392816 4/1991
JP H06347630 A 12/1994
JP 2003092816 3/2003
JP 2005331581 12/2005
JP 2007033558 A 2/2007
JP 2007079608 A 3/2007
JP 2003344630 A 9/2008
JP H11295524 A 10/2008
JP 2009169213 A 7/2009
JP 2009169214 A 7/2009
JP 2009288718 A 12/2009
JP 4491555 B1 6/2010
JP 2006337758 A 12/2010
JP 2006320807 A 7/2011
JP 2012027221 A 2/2012
JP 2012510637 A 5/2012
JP 2012230246 A 11/2012
JP 2010-139621 A * 12/2012
JP WO2011001641 A1 12/2012
JP 2009192979 A 5/2013
JP 2014134739 A 7/2014
JP 2011232511 A 11/2014
JP 2014240892 A 12/2014
JP 2015049376 A 3/2015
JP 2015118273 6/2015
JP 2014199362 A 1/2016
JP 2015105990 A 4/2018
JP 2015166861 A 6/2019
KR 20150043391 4/2015
KR 101556356 B1 10/2015
TW 201546580 A 12/2015
WO 2000079317 A1 12/2000
WO 2007089073 A1 8/2007
WO 2013162609 A1 10/2013
WO 2016168173 A1 10/2016
WO 2017193012 A1 11/2017
WO 2018140502 A1 8/2018
WO 2018140651 A1 8/2018

OTHER PUBLICATIONS

Arbabi, A. et al., “Dielectric metasurfaces for complete control of phase and polarization with subwavelength spatial resolution and high transmission,” Nature Nanotechnology, published online Aug. 31, 2015, in 8 pages. URL: www.nature.com/naturenanotechnology.
ARToolKit: https://web.archive.org/web/20051013062315/http://www.hitl.washington.edu:80/artoolkit/documentation/hardware.htm, archived Oct. 13, 2005.
AU2021290251 Examination Report dated Jan. 5, 2023.
Azuma, “A Survey of Augmented Reality,” Teleoperators and Virtual Environments 6, 4 (Aug. 1997), pp. 355-385. https://web.archive.org/web/20010604100006/http://www.cs.unc.edu/ azuma/ARpresence.pdf.
Azuma, “Predictive Tracking for Augmented Realty,” TR95-007, Department of Computer Science, UNC-Chapel Hill, NC, Feb. 1995.
Bimber, et al., “Spatial Augmented Reality—Merging Real and Virtual Worlds,” 2005 https://web.media.mit.edu/raskar/book/BimberRaskarAugmentedRealityBook.pdf.
CA3022876 Examiner Report dated Jul. 11, 2023.
Cunningham et al., “A plastic colorimetric resonant optical biosensor for multiparallel detection of label-free biochemical interactions,” Sensors and Actuators B, vol. 85, 2190226, Jul. 2002, in 8 pages.
Hasman, E. et al., “Polarization dependent focusing lens by use of quantized Pancharatnam-Berry phase diffractive optics”, Applied Physics Letters, vol. 82, No. 3, Jan. 20, 2003, in 3 pages.
Hongqiang Li, et al., “Large-Area Binary Blazed Grating Coupler between Nanophotonic Waveguide and LED,” The Scientific World Journal, vol. 2014, Article ID 586517, in six pages.
International Preliminary Report on Patentability for PCT Application No. PCT/US2016/060392, dated May 8, 2018.
International Preliminary Report on Patentability for PCT Application No. PCT/US2017/031328, dated Nov. 6, 2018.
International Search Report and Written Opinion for PCT Application No. PCT/US2016/060392, dated Feb. 6, 2017.
International Search Report and Written Opinion for PCT Application No. PCT/US2017/031328, dated Sep. 21, 2017.
Invitation to Pay Additional Fees and, Where Applicable, Protest Fee for PCT Application No. PCT/US2017/031328, dated Jul. 10, 2017.

(56) References Cited

OTHER PUBLICATIONS

Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Khorasaninejad, M. et al., "Broadband Multifunctional Efficient Meta-Gratings Based on Dielectric Waveguide Phase Shifters", Nano Letters, vol. 15, Sep. 2015, in 7 pages.
Kildishev, A. et al., "Planar Photonics with Metasurfaces", Science, vol. 339, Mar. 15, 2013, in 9 pages. URL: http://d .doi.org/10.1126/science.1232009.
KR2021-7007754 Office Action dated Nov. 2, 2022.
Laakkonen, et al., "Double-groove, two-depth grating coupler for light guides," J. Opt. Soc. Am. A/ vol. 23, No. 12/ Dec. 2006.
Lin, D. et al., "Dielectric gradient metasurface optical elements", Science, vol. 345, Issue 6194, Jul. 18, 2014, in 6 pages.
Lin, D. et al., "Supplementary Materials for Dielectric gradient metasurface optical elements", Science, vol. 345, Issue 6194, Jul. 18, 2014, in 22 pages.
Pors, A. et al., "Gap plasmon-based metasurfaces for total control of reflected light", Scientific Reports, vol. 3, Jul. 8, 2013, in 6 pages.
Schowengerdt, et al., "Volumetric Display Using Scanned Fiber Array," in Journal of SID Symposium Digest of Technical papers, vol. 41, Issue 1, May 2010.
Shalaev et al., "High-Efficiency All Dielectric Metasurfaces for Ultra-Compact Beam Manipulation in Transmission Mode," Nano letters 15.9 (2015): 6261-6266.
Tanriverdi and Jacob, "Interacting With Eye Movements in Virtual Environments," Department of Electrical Engineering and Computer Science, Tufts University, Medford, MA—paper/Proc. AMC CHI 2000 Human Factors in Computing Systems Conference, pp. 265-272, Addison-Wesley/ACM Press (2000).
Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.
Yu, N. et al., "Optical Metasurfaces and Prospect of Their Applications Including Fiber Optics", Journal of Lightwave Technology, vol. 33, No. 12, Jun. 15, 2015, in 15 pages. URL: http://ieeeplore.ieee.org/document/7045485/.
Zhao, et al., Manipulating light polarization with ultrathin plasmonic metasurfaces, Physical Review B, vol. 84, 84, 205428 (2011), Nov. 2011.
Zhou, et al., "Silicon photonic devices based on binary blazed gratings," Optical Engineering 52(9), Sep. 2013.
Zhu, A. Y. et al., "Broadband visible wavelength high efficiency meta-gratings", Conference on Lasers and Electro-Optics, OSA Technical Digest (online), Jan. 2016, in 2 pages.
English translation of JP Office Action issued in App. No. JP2023148294, dated Oct. 1, 2024, 3 pages.
European Extended Search Report, re EP Application No. 17793464.3, dated Nov. 22, 2019.

* cited by examiner 2000
2002
2000a
2010
2010
p
2021b
2021a
α
$\theta_{TIR}$
$T_{-1}$
2020b
2020a
$h_{nw}$ 2000
2020b
2010
gap
2020a
2020b
$NW_2$
2010
$NW_1$
2020a

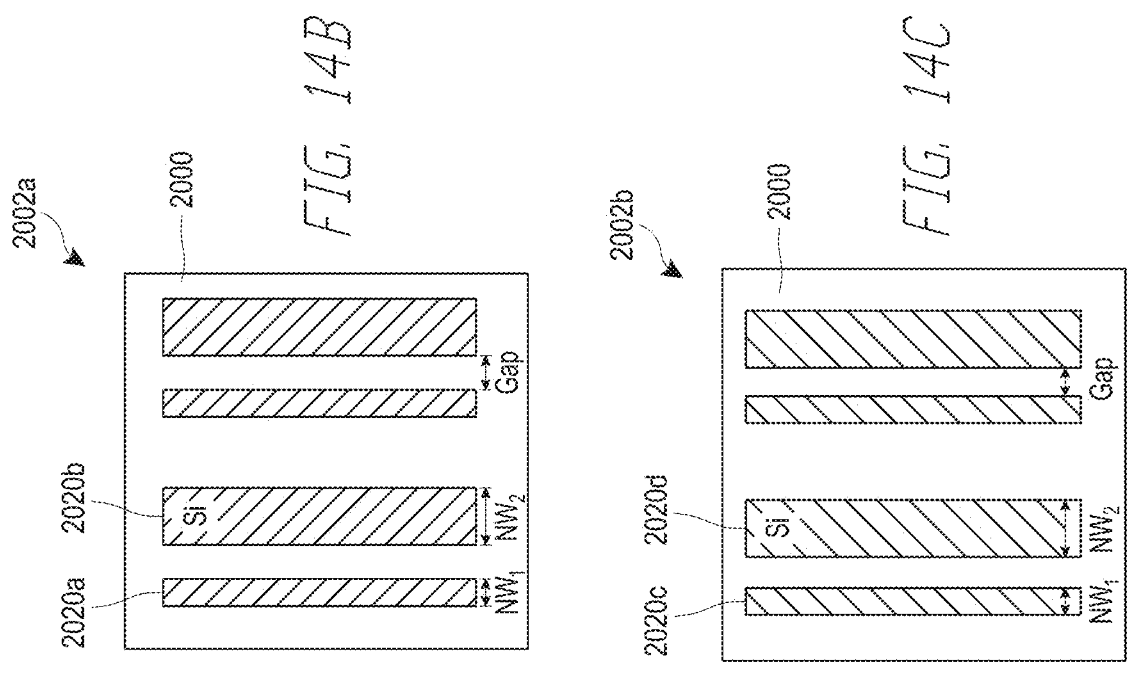
FIG. 14B
FIG. 14C
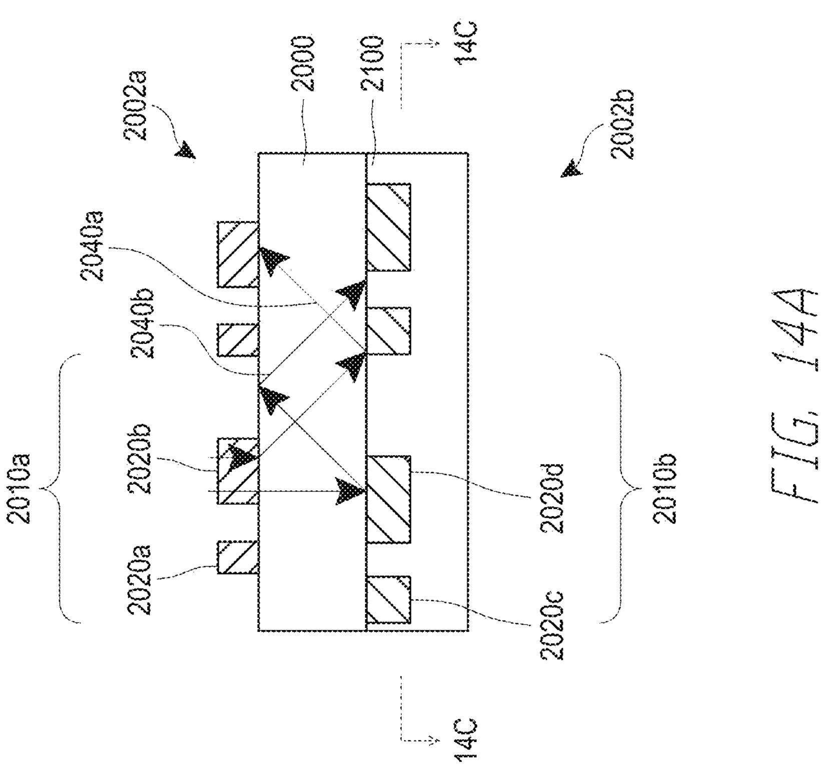
FIG. 14A 2008
2010
2014
2012
2000a
2030b
2020b
2030c
2030a
2020a
2030c
2200
2000

$R_0$
$T_0$
$T_{-1}$
$T_1$
Angle of Incidence (°)
-30
-20
-10
0
10
20
30
0.95
0.9
0.85
0.8
0.75
0.7
0.65
0.6
0.55
0.5
0.45
0.4
0.35
0.3
0.25
0.2
0.15
0.1
0.05
0

METASURFACES WITH ASYMETRIC GRATINGS FOR REDIRECTING LIGHT AND METHODS FOR FABRICATING

PRIORITY CLAIM

This application is a continuation of U.S. application Ser. No. 17/749,838, filed on May 20, 2022, which is a continuation of U.S. application Ser. No. 16/733,168, filed on Jan. 2, 2020, which is a divisional of U.S. application Ser. No. 15/588,350, filed on May 5, 2017, which claims the benefit of priority under 35 U.S.C. § 119(e) of: U.S. Provisional Application No. 62/333,067, filed on May 6, 2016; and U.S. Provisional Application No. 62/474,432, filed on Mar. 21, 2017. The entire disclosure of each of the above-referenced applications is incorporated by reference into the present disclosure.

INCORPORATION BY REFERENCE

This application incorporates by reference the entirety of each of the following patent publications: U.S. Publication No. 2015/0016777; U.S. Publication No. 2015/0178939; and U.S. Publication No. 2015/0346490.

BACKGROUND

Field

The present disclosure relates to optical devices, including augmented reality imaging and visualization systems.

Description of the Related Art

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an augmented reality scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, an optical system comprises an optically transmissive substrate comprising a metasurface which comprises a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. The heights of the first and the second nanobeams are: 10 nm to 450 nm where a refractive index of the substrate is more than 3.3; and 10 nm to 1 μm where the refractive index is 3.3 or less.

In some other embodiments, an optical system comprises an optically transmissive substrate comprising a metasurface which comprises a grating comprising a plurality of unit cells. Each unit cell comprises a laterally-elongated first nanobeam having a first width; and a laterally-elongated second nanobeam spaced apart from the first nanobeam by a gap. The second nanobeam has a second width larger than the first width. The optical system also comprises a reflector. The reflector and the substrate are on opposite sides of the grating.

In yet other embodiments, a method for forming a metasurface comprises providing an optically transmissive substrate; providing an optically transmissive layer over the substrate; and patterning the optically transmissive layer to define a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. The heights of the first and the second nanobeams are: 10 nm to 450 nm where a refractive index of the substrate is more than 3.3; and 10 nm to 1 μm where the refractive index is 3.3 or less.

In some other embodiments, a method for forming a metasurface comprises providing an optically transmissive substrate and forming a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. The method also comprises providing a layer of reflective material in the gap and between the unit cells.

In some other embodiments, a method for forming a metasurface comprises providing an optically transmissive substrate; and forming a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. The method further comprises depositing a layer of optically transmissive spacer material in the gap and between the unit cells; and depositing a reflective layer on the layer of spacer material, wherein the spacer material separates the grating from the reflective layer.

In yet other embodiments, an optical system comprises an optically transmissive substrate comprising a metasurface which comprises a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. A pitch of the unit cells is 10 nm to 1 μm.

In some other embodiments, a method for forming a metasurface comprises providing an optically transmissive substrate; providing an optically transmissive layer over the substrate; and patterning the optically transmissive layer to define a grating comprising a plurality of unit cells. Each unit cell comprises a laterally-elongated first nanobeam having a first width; and a laterally-elongated second nanobeam spaced apart from the first nanobeam by a gap, the second nanobeam having a second width larger than the first width. A pitch of the unit cells is 10 nm to 1 μm.

In yet other embodiments, an optical system comprises an optically transmissive substrate comprising a multilevel metasurface. The multilevel metasurface comprises a grating comprising a plurality of multilevel unit cells. Each unit cell comprises, on a lowermost level of the unit cell, a laterally-elongated, first lowermost level nanobeam having a first width; and a laterally-elongated, second lowermost level nanobeam having a second width, where the second width is larger than the first width. On an uppermost level of the unit cell is a laterally-elongated, first uppermost level nanobeam above the first lowermost level nanobeam; and a laterally-elongated, second uppermost level nanobeam above the second lowermost level nanobeam.

In some other embodiments, a method for forming a metasurface comprises providing an optically transmissive substrate; providing an optically transmissive layer over the substrate; and patterning the optically transmissive layer to define a plurality of repeating units. Each repeating unit comprises a laterally-elongated first nanobeam having a first width; and a laterally-elongated second nanobeam spaced-apart from the first nanobeam by a gap, the second nanobeam having a second width larger than the first width. The method also comprises depositing an optically transmissive material on the first and second nanobeams and into the gaps between the nanobeams to form spaced apart plateaus of the optically transmissive material above the nanobeams.

Additional example embodiments are provided below.

1. An optical system comprising:
   an optically transmissive substrate comprising a metasurface, the metasurface comprising, as seen in a top-down view:
      a grating comprising a plurality of unit cells, each unit cell comprising:
         a laterally-elongated first nanobeam having a first width; and
         a laterally-elongated second nanobeam spaced apart from the first nanobeam by a gap, the second nanobeam having a second width larger than the first width,
      wherein heights of the first and the second nanobeams are:
         10 nm to 450 nm where a refractive index of the substrate is more than 3.3; and
         10 nm to 1 μm where the refractive index is 3.3 or less.
2. The optical system of embodiment 1, wherein the unit cells are laterally-elongated and are parallel to each other.
3. The optical system of embodiment 1, wherein the metasurface is configured to diffract incident light of a visible wavelength into a first diffraction order.
4. The optical system of embodiment 1, wherein the second width is 10 nm to 1 μm.
5. The optical system of embodiment 4, wherein the second width is 10 nm to 300 nm.
6. The optical system of embodiment 1, wherein a pitch of the unit cells is 10 nm to 1 μm.
7. The optical system of embodiment 6, wherein the pitch of the unit cells is 10 nm to 500 nm.
8. The optical system of embodiment 1, wherein the first nanobeam and the second nanobeam are separated by a gap of 10 nm to 1 μm.
9. The optical system of embodiment 8, wherein the gap is 10 nm to 300 nm wide.
10. The optical system of embodiment 1, wherein the optically transmissive substrate comprises a glass.
11. The optical system of embodiment 1, wherein the first and second nanobeam comprises silicon.
12. The optical system of embodiment 11, wherein the first and second nanobeam comprises silicon nitride.
13. The optical system of embodiment 1, wherein the optically transmissive substrate and the metasurface form a polarizing beam splitter.
14. The optical system of embodiment 1, wherein the optically transmissive substrate is a waveguide plate.
15. The optical system of embodiment 14, further comprising a stack of the optically transmissive substrates, wherein dimensions of features of the unit cells varies between the substrates.
16. The optical system of embodiment 1, wherein the metasurface is an incoupling optical element, further comprising an image injection device configured to project light to the incoupling optical element, wherein the metasurface is configured to redirect the light to propagate the light through the substrate by total internal reflection.
17. The optical system of embodiment 1, wherein the metasurface is an outcoupling optical element, wherein the metasurface is configured to extract light out of the substrate.
18. An optical system comprising:
   an optically transmissive substrate comprising a metasurface, the metasurface comprising:
      a grating comprising a plurality of unit cells, each unit cell comprising, as seen in a top-down view:
         a laterally-elongated first nanobeam having a first width; and
         a laterally-elongated second nanobeam spaced apart from the first nanobeam by a gap, the second nanobeam having a second width larger than the first width; and
   a reflector, wherein the reflector and the substrate are on opposite sides of the grating.
19. The optical system of embodiment 18, wherein the reflector is spaced apart from the grating.
20. The optical system of embodiment 19, wherein the grating is embedded in an optically transmissive material.
21. The optical system of embodiment 20, wherein the optically transmissive material spaces the reflector apart from the grating.
22. The optical system of embodiment 18, wherein the substrate comprises:
   a second metasurface on a side of the substrate opposite the metasurface, the second metasurface comprising:
      a second grating comprising a plurality of second unit cells, each second unit cell comprising, as seen in a top-down view:
         a laterally-elongated third nanobeam; and a laterally-elongated fourth nanobeam spaced apart from the third nanobeam by a gap, wherein the fourth nanobeam is wider than the third nanobeam.

23. The optical system of embodiment 18, wherein the unit cells are laterally-elongated and are parallel to each other.

24. The optical system of embodiment 18, wherein the metasurface is configured to diffract incident light of a visible wavelength into a first diffraction order 25. The optical system of embodiment 18, wherein the second width is 10 nm to 1 μm. will 26. The optical system of embodiment 25, wherein the second width is 10 nm to 300 nm.

27. The optical system of embodiment 18, wherein a pitch of the unit cells is 10 nm to 1 μm.

28. The optical system of embodiment 27, wherein the pitch of the unit cells is 10 nm to 500 nm.

29. The optical system of embodiment 18, wherein the first nanobeam and the second nanobeam are separated by a gap of 10 nm to 1 μm.

30. The optical system of embodiment 29, wherein the gap is 10 nm to 300 nm wide.

31. The optical system of embodiment 18, wherein the optically transmissive substrate comprises a glass.

32. The optical system of embodiment 18, wherein the first and second nanobeam comprises silicon.

33. The optical system of embodiment 32, wherein the first and second nanobeam comprises silicon nitride.

34. The optical system of embodiment 18, wherein the optically transmissive substrate and the metasurface form a polarizing beam splitter.

35. The optical system of embodiment 27, wherein the optically transmissive substrate is a waveguide plate.

36. The optical system of embodiment 35, further comprising a stack of the optically transmissive substrates, wherein dimensions of features of the unit cells varies between the substrates.

37. The optical system of embodiment 18, wherein the metasurface is an incoupling optical element, further comprising an image injection device configured to project light to the incoupling optical element, wherein the metasurface is configured to redirect the light to propagate the light through the substrate by total internal reflection.

38. The optical system of embodiment 18, wherein the metasurface is an outcoupling optical element, wherein the metasurface is configured to extract light out of the substrate.

39. A method for forming a metasurface, the method comprising:

providing an optically transmissive substrate;

providing an optically transmissive layer over the substrate; and patterning the optically transmissive layer to define a grating comprising a plurality of unit cells, each unit cell comprising, as seen in a top-down view:

a laterally-elongated first nanobeam having a first width; and a laterally-elongated second nanobeam spaced apart from the first nanobeam by a gap, the second nanobeam having a second width larger than the first width, wherein heights of the first and the second nanobeams are:

10 nm to 450 nm where a refractive index of the substrate is more than 3.3; and 10 nm to 1 μm where the refractive index is 3.3 or less.

40. The method of embodiment 39, wherein patterning the optically transmissive layer comprises:

providing a resist layer over the optically transmissive layer;

defining a pattern in the resist layer; and transferring the pattern from the resist layer to the optically transmissive layer.

41. The method of embodiment 40, further comprising depositing an optically transmissive material between and over the grating.

42. The method of embodiment 41, further comprising forming a reflective layer on the optically transmissive material.

43. The method of embodiment 40, wherein transferring comprises performing an anisotropic etch.

44. A method for forming a metasurface, the method comprising:

providing an optically transmissive substrate;

forming a grating comprising a plurality of unit cells, each unit cell comprising, as seen in a top-down view:

a laterally-elongated first nanobeam having a first width; and a laterally-elongated second nanobeam spaced apart from the first nanobeam by a gap, the second nanobeam having a second width larger than the first width, and providing a layer of reflective material in the gap and between the unit cells.

45. The method of embodiment 44, wherein providing the layer of reflective material comprises depositing reflective material between and over the first and second nanobeams.

46. The method of embodiment 45, wherein the reflective material comprises aluminum.

47. The method of embodiment 44, wherein forming the grating comprises:

depositing an optically transmissive layer over the substrate; and patterning the optically transmissive layer to define the grating.

48. The method of embodiment 47, wherein patterning the optically transmissive layer comprises:

providing a resist layer over the optically transmissive layer;

defining a pattern in the resist layer; and transferring the pattern from the resist layer to the optically transmissive layer.

49. A method for forming a metasurface, the method comprising:

providing an optically transmissive substrate;

forming a grating comprising a plurality of unit cells, each unit cell comprising, as seen in a top-down view:

a laterally-elongated first nanobeam having a first width; and a laterally-elongated second nanobeam spaced apart from the first nanobeam by a gap, the second nanobeam having a second width larger than the first width, depositing a layer of optically transmissive spacer material in the gap and between the unit cells; and depositing a reflective layer on the layer of spacer material, wherein the spacer material separates the grating from the reflective layer.

50. The method of embodiment 49, wherein the spacer material has a refractive index of 1 to 2.
51. An optical system comprising:
  an optically transmissive substrate comprising a metasurface, the metasurface comprising:
    a grating comprising a plurality of unit cells, each unit cell comprising, as seen in a top-down view:
      a laterally-elongated first nanobeam having a first width; and
      a laterally-elongated second nanobeam spaced apart from the first nanobeam by a gap, the second nanobeam having a second width larger than the first width,
    wherein a pitch of the unit cells is 10 nm to 1 µm.
52. The system of embodiment 51, wherein the pitch is 300 nm to 500 nm.
53. The system of embodiment 51, wherein the metasurface is configured to diffract incident light of a visible wavelength into a first diffraction order.
54. The optical system of embodiment 51, wherein the unit cells are laterally-elongated and are parallel to each other.
55. The optical system of embodiment 51, wherein the second width is 10 nm to 1 µm.
56. The optical system of embodiment 55, wherein the second width is 10 nm to 300 nm.
57. The optical system of embodiment 51, wherein a pitch of the unit cells is 10 nm to 1 µm.
58. The optical system of embodiment 57, wherein the pitch of the unit cells is 10 nm to 500 nm.
59. The optical system of embodiment 51, wherein the first nanobeam and the second nanobeam are separated by a gap of 10 nm to 1 µm.
60. The optical system of embodiment 59, wherein the gap is 10 nm to 300 nm wide.
61. The optical system of embodiment 51, wherein the optically transmissive substrate comprises a glass.
62. The optical system of embodiment 51, wherein the first and second nanobeam comprises silicon.
63. The optical system of embodiment 62, wherein the first and second nanobeam comprises silicon nitride.
64. The optical system of embodiment 51, wherein the optically transmissive substrate and the metasurface form a polarizing beam splitter.
65. The optical system of embodiment 51, wherein the optically transmissive substrate is a waveguide plate.
66. The optical system of embodiment 65, further comprising a stack of the optically transmissive substrates, wherein dimensions of features of the unit cells varies between the substrates.
67. The optical system of embodiment 51, wherein the metasurface is an incoupling optical element, further comprising an image injection device configured to project light to the incoupling optical element, wherein the metasurface is configured to redirect the light to propagate the light through the substrate by total internal reflection.
68. The optical system of embodiment 51, wherein the metasurface is an outcoupling optical element, wherein the metasurface is configured to extract light out of the substrate.
69. A method for forming a metasurface, the method comprising:
  providing an optically transmissive substrate;
  providing an optically transmissive layer over the substrate; and
  patterning the optically transmissive layer to define a grating comprising a plurality of unit cells, each unit cell comprising, as seen in a top-down view:
    a laterally-elongated first nanobeam having a first width; and
    a laterally-elongated second nanobeam spaced apart from the first nanobeam by a gap, the second nanobeam having a second width larger than the first width,
  wherein a pitch of the unit cells is 10 nm to 1 µm.
70. The method of embodiment 69, wherein the pitch is 300 nm to 500 nm.
70.1 The method of embodiment 69, wherein the metasurface is configured to diffract incident light of a visible wavelength into a first diffraction order.
71. An optical system comprising:
  an optically transmissive substrate comprising a multilevel metasurface, the multilevel metasurface comprising:
    a grating comprising a plurality of multilevel unit cells, each unit cell comprising, as seen in a top-down view:
      on a lowermost level of the unit cell:
        a laterally-elongated, first lowermost level nanobeam having a having a first width; and
        a laterally-elongated, second lowermost level nanobeam having a having a second width, wherein the second width is larger than the first width; and
      on an uppermost level of the unit cell:
        a laterally-elongated, first uppermost level nanobeam above the first lowermost level nanobeam; and
        a laterally-elongated, second uppermost level nanobeam above the second lowermost level nanobeam.
72. The optical system of embodiment 71, wherein the first and second uppermost level nanobeams comprise a different material from the first and second lowermost level nanobeams.
73. The optical system of embodiment 71, wherein the first and second lowermost level nanobeams comprise photoresist.
74. The optical system of embodiment 73, wherein the first and second lowermost level nanobeams comprise silicon.
75. The optical system of embodiment 74, wherein the first and second lowermost level nanobeams comprise silicon nitride.
76. The optical system of embodiment 73, wherein the first and second lowermost level nanobeams comprise an oxide.
77. The optical system of embodiment 76, wherein the first and second lowermost level nanobeams comprise titanium oxide.
78. The optical system of embodiment 71, wherein the first and second lowermost level nanobeams of the plurality of unit cells extend parallel to each other.
79. The optical system of embodiment 71, wherein the first width is 10 nm to 250 nm.
80. The optical system of embodiment 79, wherein the second width is 10 nm to 300 nm.
81. The optical system of embodiment 71, wherein a pitch of the unit cells is 300 nm to 500 nm.
82. The optical system of embodiment 71, wherein the first nanobeam and the second nanobeam are separated by a gap of 10 nm to 300 nm.

83. The optical system of embodiment 71, wherein the optically transmissive substrate and the metasurface form a polarizing beam splitter.
84. The optical system of embodiment 71, wherein the optically transmissive substrate is a waveguide plate.
85. The optical system of embodiment 71, wherein the metasurface forms an incoupling optical element, further comprising an image injection device configured to project light to the incoupling optical element, wherein the metasurface is configured to redirect the light to propagate the light through the substrate by total internal reflection.
86. The optical system of embodiment 84, further comprising a stack of the optically transmissive substrates, wherein dimensions of features of the unit cells varies between the substrates, wherein the metasurface is an incoupling optical element, further comprising an image injection device configured to project light to the incoupling optical element, wherein the metasurface is configured to redirect the light to propagate the light through the substrate by total internal reflection.
87. The optical system of embodiment 71, wherein the metasurface is an outcoupling optical element, wherein the metasurface is configured to extract light out of the substrate.
88. The optical system of embodiment 71, wherein the grating is embedded in an optically transmissive material.
89. A method for forming a metasurface, the method comprising:
   providing an optically transmissive substrate;
   providing an optically transmissive layer over the substrate; and
   patterning the optically transmissive layer to define a plurality of repeating units, each repeating unit comprising, as seen in a top-down view:
      a laterally-elongated first nanobeam having a first width; and
      a laterally-elongated second nanobeam spaced-apart from the first nanobeam by a gap, the second nanobeam having a second width larger than the first width; and
   depositing an optically transmissive material on the first and second nanobeams and into the gaps between the nanobeams to form spaced apart plateaus of the optically transmissive material above the nanobeams.
90. The method of embodiment 89, wherein the optically transmissive material has a higher refractive index than either the patterned resist or the substrate.
91. The method of embodiment 89, wherein patterning the optically transmissive layer comprises patterning resist.
92. The method of embodiment 91, wherein patterning the resist comprises imprinting the pattern into the resist.
93. The method of embodiment 91, wherein depositing the optically transmissive material comprises spin coating the optically transmissive material on the patterned resist.
94. The method of embodiment 91, wherein depositing the optically transmissive material comprises performing a conformal deposition or a directional deposition of the optically transmissive material.
95. The method of embodiment 94, wherein the conformal deposition comprises chemical vapor deposition or atomic layer deposition of the optically transmissive material.
96. The method of embodiment 95, wherein the directional deposition comprises evaporation or sputtering the optically transmissive material.
97. The method of embodiment 89, wherein the first width is 10 nm to 250 nm.
98. The method of embodiment 97, wherein the second width is 10 nm to 300 nm.
99. The method of embodiment 89, wherein a pitch of the unit cells is 300 nm to 500 nm.
100. The optical system of embodiment 89, wherein the first nanobeam and the second nanobeam are separated by a gap of 10 nm to 300 nm.
101. The method of embodiment 89, wherein the optically transmissive substrate is a waveguide.

Additional and other objects, features, and advantages of the invention are described in the detail description, figures and claims.

BRIEF DESCRIPTION OF THE DRAWINGS

FIG. 14A illustrates an example of a cross-sectional side view of a substrate having both transmissive and reflective metasurface.

FIG. 14B illustrates an example of a top-down view of the metasurface of FIG. 14A.

FIG. 14C illustrates an example of a top-down view of the metasurface of FIG. 14A viewed on the plane 14C of FIG. 14A.

Figure 1:
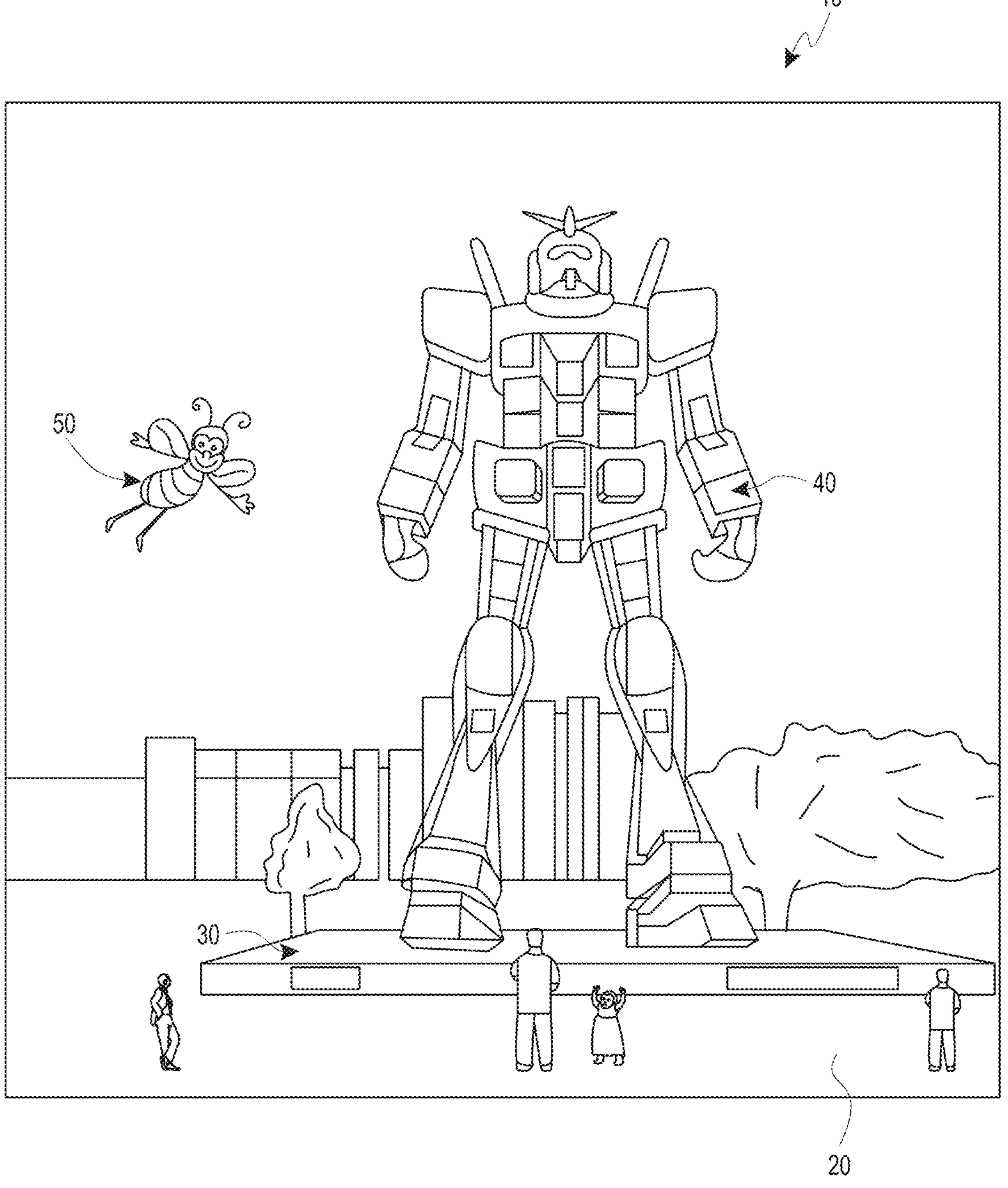
FIG. 1 illustrates a user's view of augmented reality (AR) through an AR device.

The drawings are provided to illustrate example embodiments described herein and are not intended to limit the scope of the disclosure. It will be appreciated that the drawings are schematic and not necessarily drawn to scale.

DETAILED DESCRIPTION

Metasurfaces, metamaterial surfaces, provide opportunities to realize virtually flat, aberration-free optics on much smaller scales, in comparison with geometrical optics. Without being limited by theory, in some embodiments, metasurfaces include dense arrangements of surface structures that function as resonant optical antennas. The resonant nature of the light-surface structure interaction provides the ability to manipulate optical wave-fronts. In some cases, the metasurfaces may allow the replacement of bulky or difficult to manufacture optical components with thin, planar elements formed by simple patterning processes.

One type of a conventional optical element is a blaze grating, which may be desirable in some applications for having high selectivity in redirecting light. These gratings, however, typically have sloped surfaces and may be challenging to manufacture. Advantageously, in some embodiments, metasurfaces are disclosed that are able to redirect light, similar to a blazed grating, in the visible range while having a relatively flat response over a wide range of incoming angles, and while providing a more easily manufactured structure.

The metasurfaces may take the form of an asymmetric grating formed by a plurality of repeating unit cells. Each unit cell comprises two laterally-elongated protrusions, which may be also referred to as nanobeams or nanowires, with one protrusion being wider than the other. As used herein, a protrusion, nanobeam or nanowire, is an elongated volume of material, e.g., a single substantially homogeneous material. It will be appreciated that these elongated structures are not limited to any particular cross-sectional shape. In some embodiments, the cross-sectional shape is rectangular. Preferably, the nanobeams have a sub-wavelength width and spacing from one another. For example, the widths of the nanobeams may be less than the wavelengths of light that the metasurface is configured to redirect. In some embodiments, the units cells formed by the nanobeams may be on or proximate the surface of an optically transmissive substrate, e.g., a waveguide.

In some embodiments, the metasurfaces may work in a transmission mode in which light is incident on the metasurface from a first side of the metasurface, propagates through the metasurface, and subsequently propagates away from the metasurface on an opposite side of the metasurface. The light propagates away from the metasurface in a direction different from the incident direction of the light on the first side.

In some other embodiments, the metasurface may work in a reflective mode in which the light is incident from the first side of the metasurface, and is reflected back on the first side to propagate away from the metasurface. In the reflective mode, the metasurface may include nanobeams embedded within a reflective layer. In some other embodiments, the nanobeams may be embedded within a spacer layer, and a reflective layer may be provided directly on the spacer layer, on a side of the metasurface opposite the first side.

Preferably, the features forming the metasurface are configured to redirect light, e.g. by diffraction. In some embodiments, the light is visible light having a wavelength in the range of 350 nm to 800 nm. In some embodiments, the metasurface is configured to diffract incident light of a visible wavelength into a first diffraction order In some embodiments, the widths of the nanobeams forming the unit cells are in the range of 10 nm to 1 μm, including 10 nm to 300 nm or 10 nm to 250 nm. The nanobeams may be separated by a gap in the range of 5 nm to 1 μm wide, including 10 nm to 1 μm wide or 10 nm to 300 nm wide. The pitch of the unit cells (that is, the distance between identical points in directly neighboring unit cells) may be in the range of 10 nm to 1 μm, including 10 nm to 500 nm, or 300 nm to 500 nm. In some embodiments, the heights of the nanobeams may be in the range of 10 nm to 1 μm, including 10 nm to 500 nm or 10 nm to 450 nm.

It has been found that the dimensions of features of the unit cells may vary depending upon the properties of the materials used to form the metasurface. For example, the height of the nanobeams may vary depending upon the refractive index of the material used for those nanobeams. In some embodiments, the heights of the nanobeams may be 10 nm to 450 nm where a refractive index of the material is more than 3.3; and 10 nm to 1 μm where the refractive index is 3.3 or less. As another example, the height of the nanobeams may be 10 nm to 450 nm where the nanobeams are formed of silicon (e.g., amorphous or polysilicon).

In some embodiments, the metasurface is a multilevel (e.g., bi-level) structure having unit cells with relatively narrow and relatively wide nanobeams as noted above on a lowermost level, and a second optically transmissive material between the nanobeams on the lowermost level. The metasurface may also include a second level formed by a second optically transmissive material disposed on top surfaces of the nanobeams. The material on the second level may be localized on the top surfaces of the nanobeams and may form spaced apart plateaus of the material, as seen in a cross-sectional view taken along a plane orthogonal to the length axis of the nanobeams. In some embodiments, the heights of the material on the second level may be in the range of 10 nm to 1 μm, including 10 nm to 600 nm.

It will be appreciated that, in some embodiments, the metasurface selectively redirects some wavelengths of light, while being transmissive to other wavelengths of light. Such properties are typically engineered with structures on micron scales (e.g., in photonics crystal fibers or distributed bragg reflectors), while various embodiments herein include geometries on nano-scales (e.g. 10-100× smaller scales), and provide selective redirection of light in the visible part of the electromagnetic spectrum. In some embodiments, the nanobeams may be formed on the surface of the substrate a single level, thereby providing a simple to manufacture structure. Advantageously, the metasurfaces may be formed using patterning and deposition processes, e.g., lithography and chemical etching. In some embodiments, the metasurfaces may be patterned using nanoimprinting, thereby avoiding costly lithography and etch processes.

Metasurfaces formed according to various embodiments provide one or more of the following advantages. For example, the metasurfaces may have a relatively large angular bandwidth over which it may redirect or diffract light. In addition, the metasurfaces may have a good diffraction efficiency over this bandwidth. For example, the diffraction efficiency may be 25% or more, 30% or more, or 40% or more, over an angular bandwidth (FWHM) of 40°, or 50° (as measured from the normal to a surface). Moreover, the diffraction efficiency over the angular bandwidth may be advantageously flat, e.g., varying by less than 25%, 20%, 15%, or 10% over the angular bandwidth. The metasurfaces may also have a large deflection angle, which may advantageously be applied to incouple light within the angular bandwidth by redirecting the light such that it propagates at angles suitable for total internal reflection (TIR). In addition, the advantages noted above may be realized in a number of wavelengths of light corresponding to different component colors for forming images. For example, the wavelengths may correspond to the colors red, green, and blue (e.g. wavelengths of 455 nm, 520 nm, and 638 nm). In a reflective mode, the metasurface may provide color selective beam shaping with a high extinction ratio (e.g., 5 or more, 10 or more, 20 or more). In some embodiments, the metasurfaces exhibit strong polarization dependence and may function as a polarization beam splitter. For example, for light of different polarizations, the metasurface may exhibit extinction ratios of 5 or more, 7 or more, or 9 or more.

In some embodiments, the waveguides supporting the metasurfaces may form direct view display devices or near-eye display devices, with the waveguides configured to receive input image information and generate an output image based on the input image information. These devices may be wearable and constitute eyewear in some embodiments. The input image information received by the waveguides can be encoded in multiplexed light streams of different wavelengths (e.g., red, green and blue light) that are incoupled into one or more waveguides. Incoupled light may propagate through the waveguide due to total internal reflection. The incoupled light may be outcoupled (or outputted) from the waveguide by one or more outcoupling optical elements.

In some embodiments, the metasurfaces be the incoupling and/or outcoupling optical elements. The compactness and planarity of the metasurface allows for a compact waveguide, and for a compact stack of waveguides where multiple waveguides form a stack. In addition, the high wavelength selectivity of the metasurface allows for a high degree of precision in incoupling and/or outcoupling light, which can provide high image quality in applications where the light contains image information. For example, the high selectivity may reduce channel crosstalk in configurations in which full color images are formed by outputting light of different colors or wavelengths at the same time.

Reference will now be made to the Figures, in which like reference numbers refer to like features throughout.

Example Display Systems

Various embodiments disclosed herein may be implemented in optical devices to steer or redirect light, and may be particularly advantageously employed as parts of display systems. In some embodiments, the display systems take the form of eyewear (e.g., they are wearable), which may advantageously provide a highly immersive VR or AR experience. For example, displays containing waveguides for displaying multiple depth planes, e.g. a stack of waveguides (one waveguide or set of waveguides for each depth plane), may be configured to be worn positioned in front of the eyes of a user, or viewer. In some embodiments, multiple waveguides, e.g. two stacks of waveguides, one for each eye of a viewer, may be utilized to provide different images to each eye.

Figure 2:
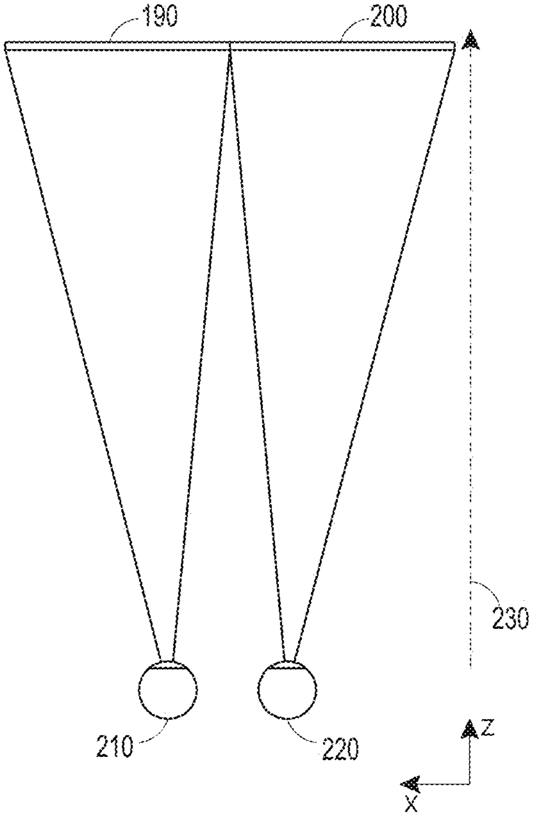
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
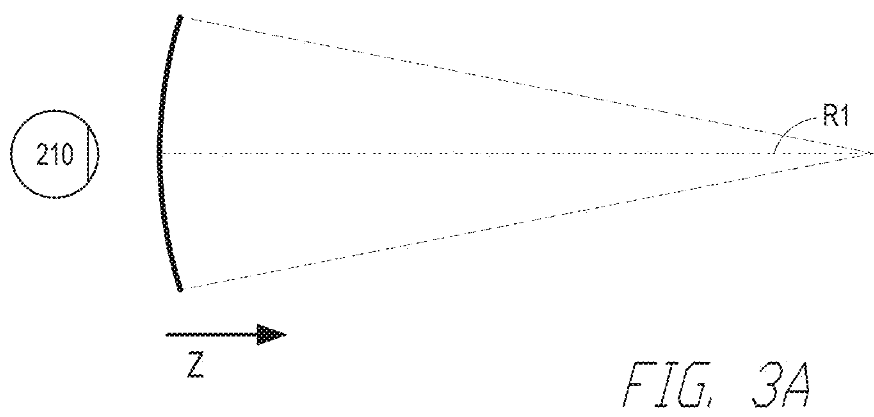
FIGS. 3A-3C illustrate relationships between radius of curvature and focal radius.
Figure 3B:
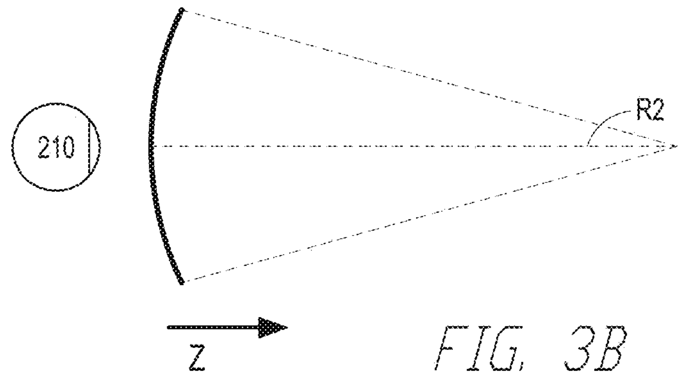
Figure 3C:
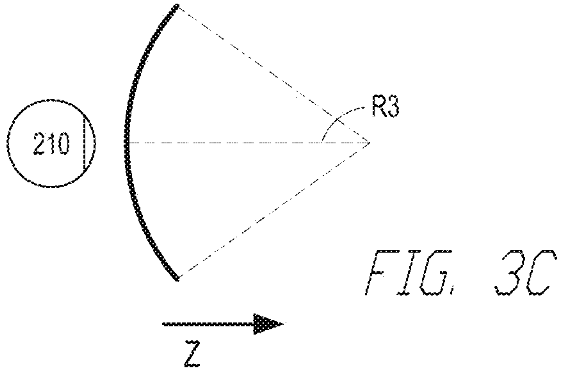

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur is eliminated or minimized, thereby forming a focused image of the object of fixation on the retina/fovea of the eye. The process by which the lens of the eye changes shape may be referred to as accommodation, and the shape of the lens of the eye required to form a focused image of the object of fixation on the retina/fovea of the eye may be referred to as an accommodative state.

Figure 4A:
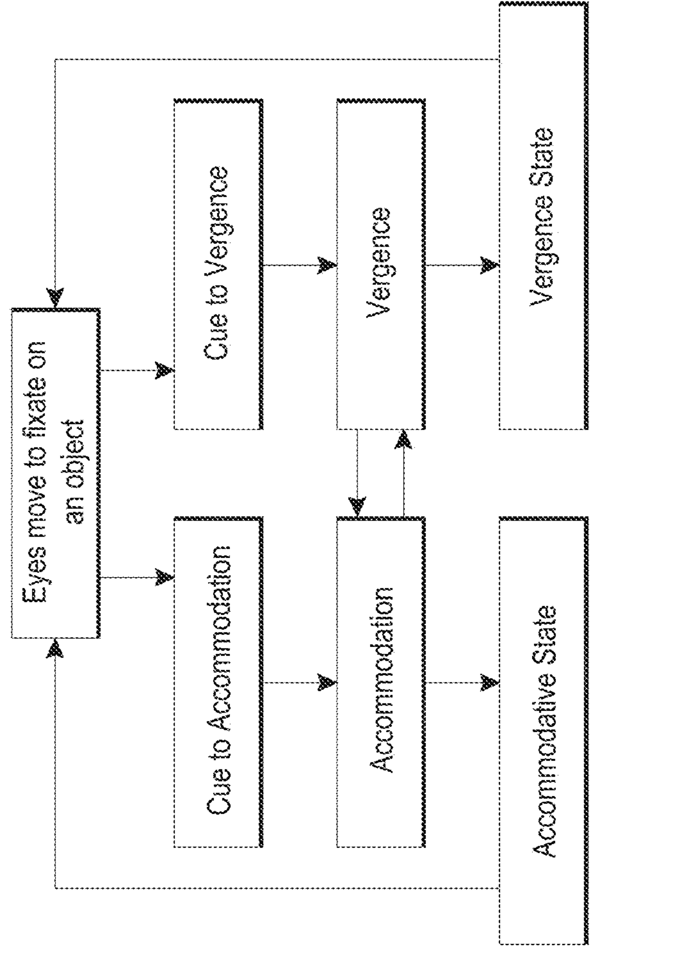
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina/fovea of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
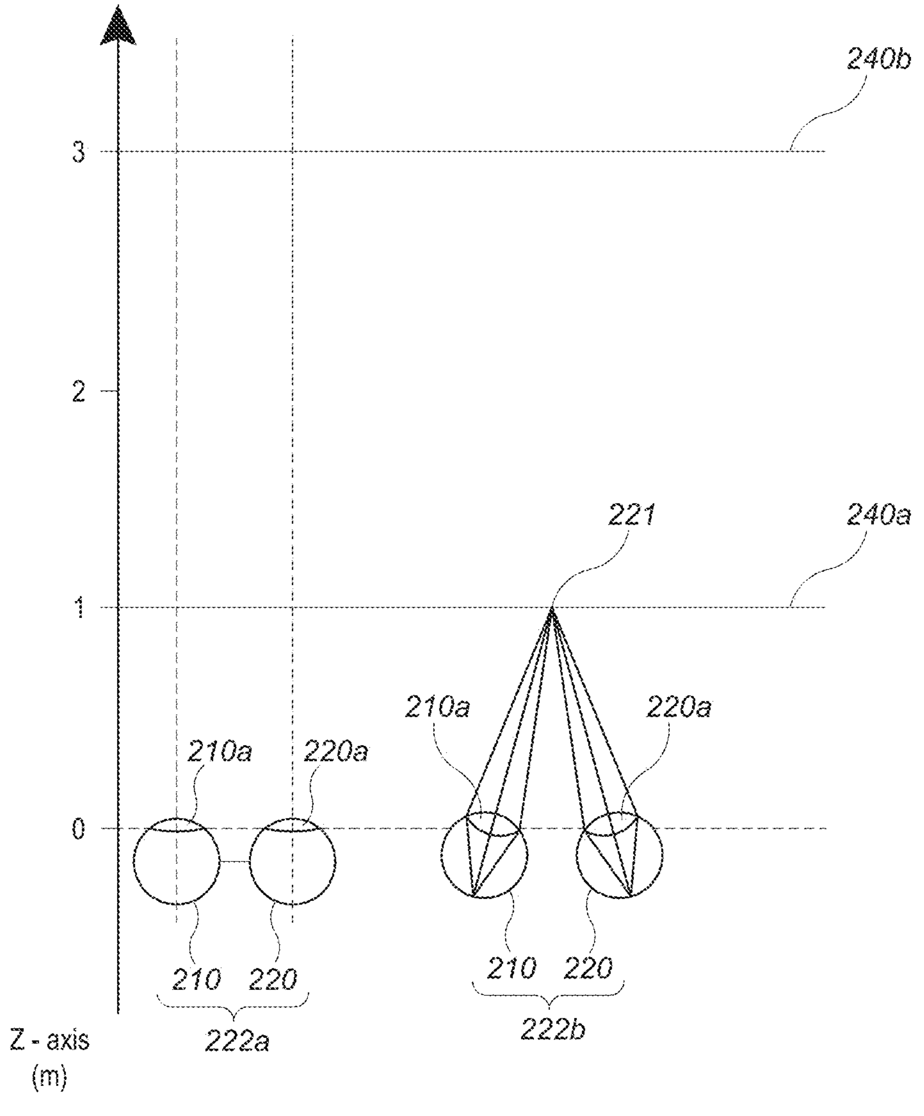
FIG. 4B illustrates examples of different accommodative states and vergence states of a pair of eyes of the user.

With reference now to FIG. 4B, examples of different accommodative and vergence states of the eyes are illustrated. The pair of eyes 222*a* are fixated on an object at optical infinity, while the pair eyes 222*b* are fixated on an object 221 at less than optical infinity. Notably, the vergence states of each pair of eyes is different, with the pair of eyes 222*a* directed straight ahead, while the pair of eyes 222 converge on the object 221. The accommodative states of the eyes forming each pair of eyes 222*a* and 222*b* are also different, as represented by the different shapes of the lenses 210*a*, 220*a*.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero point located at the exit pupils of the user's eyes. Thus, a depth plane 240 located at a depth of 1 m corresponds to a distance of 1 m away from the exit pupils of the user's eyes, on the optical axis of those eyes. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figures 4C, 4D:
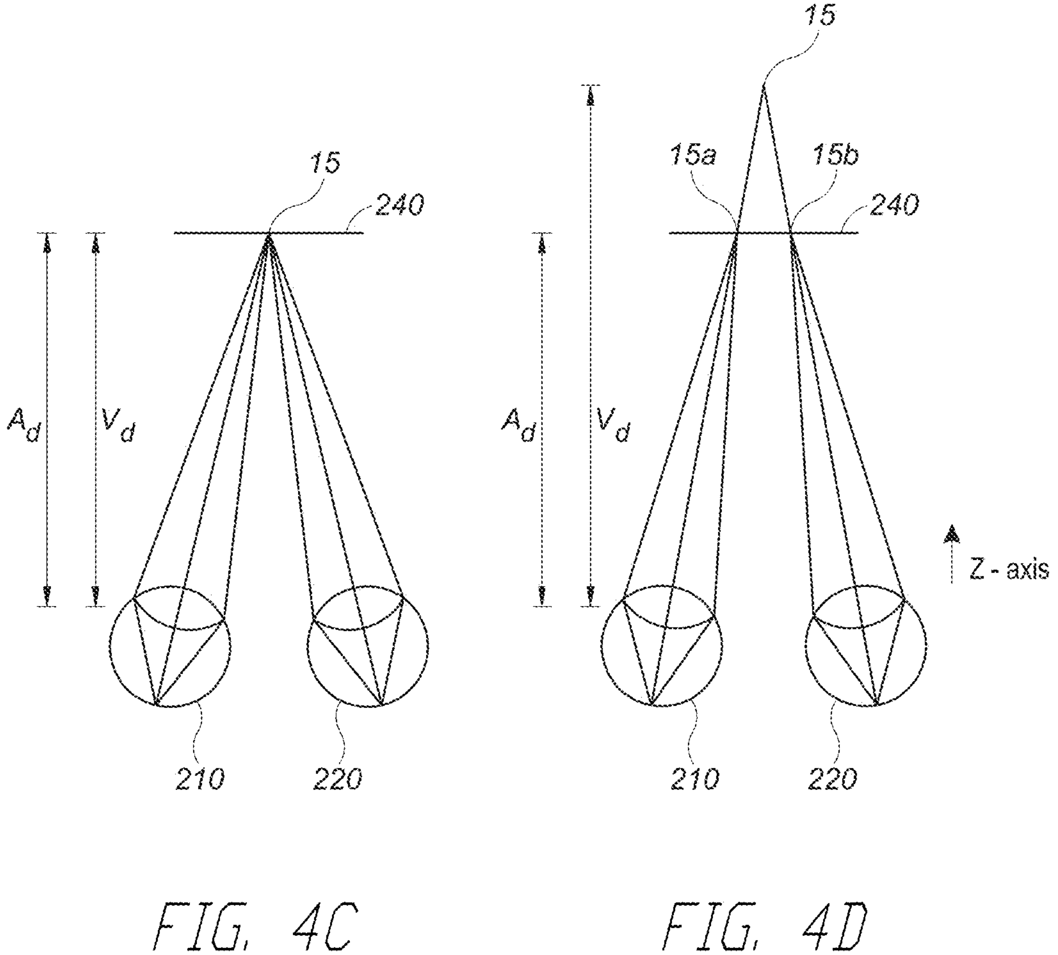
FIG. 4C illustrates an example of a representation of a top-down view of a user viewing content via a display system.
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15*a*, 15*b* on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

Without being limited by theory, it is believed that users may still perceive accommodation-vergence mismatches of up to 0.25 diopter, up to 0.33 diopter, and up to about 0.5 diopter as being physiologically correct, without the mismatch itself causing significant discomfort. In some embodiments, display systems disclosed herein (e.g., the display system 250, FIG. 6) are configured to present images to the viewer using light with wavefront divergence and images with binocular cues that provide an accommodation-vergence mismatch of 0.5 diopter or less. In some other embodiments, the display systems are configured to present images to the viewer using light with wavefront divergence and images with binocular cues that provide an accommodation-vergence mismatch of 0.33 diopter or less. In yet other embodiments, the display systems are configured to present images to the viewer using light with wavefront divergence and images with binocular cues that provide an accommodation-vergence mismatch of 0.25 diopter or less, including about 0.1 diopter or less.

In some embodiments, it will be appreciated that a reference point other than exit pupils of the eyes 210, 220 may be utilized for determining distance, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Figure 5:
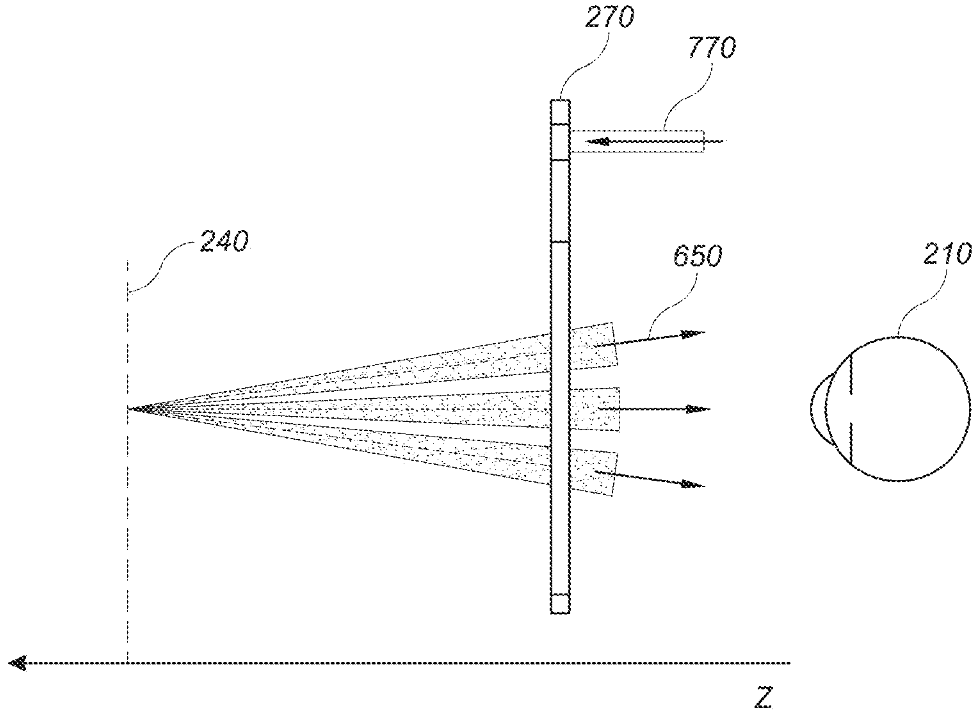
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths.

Figure 6:
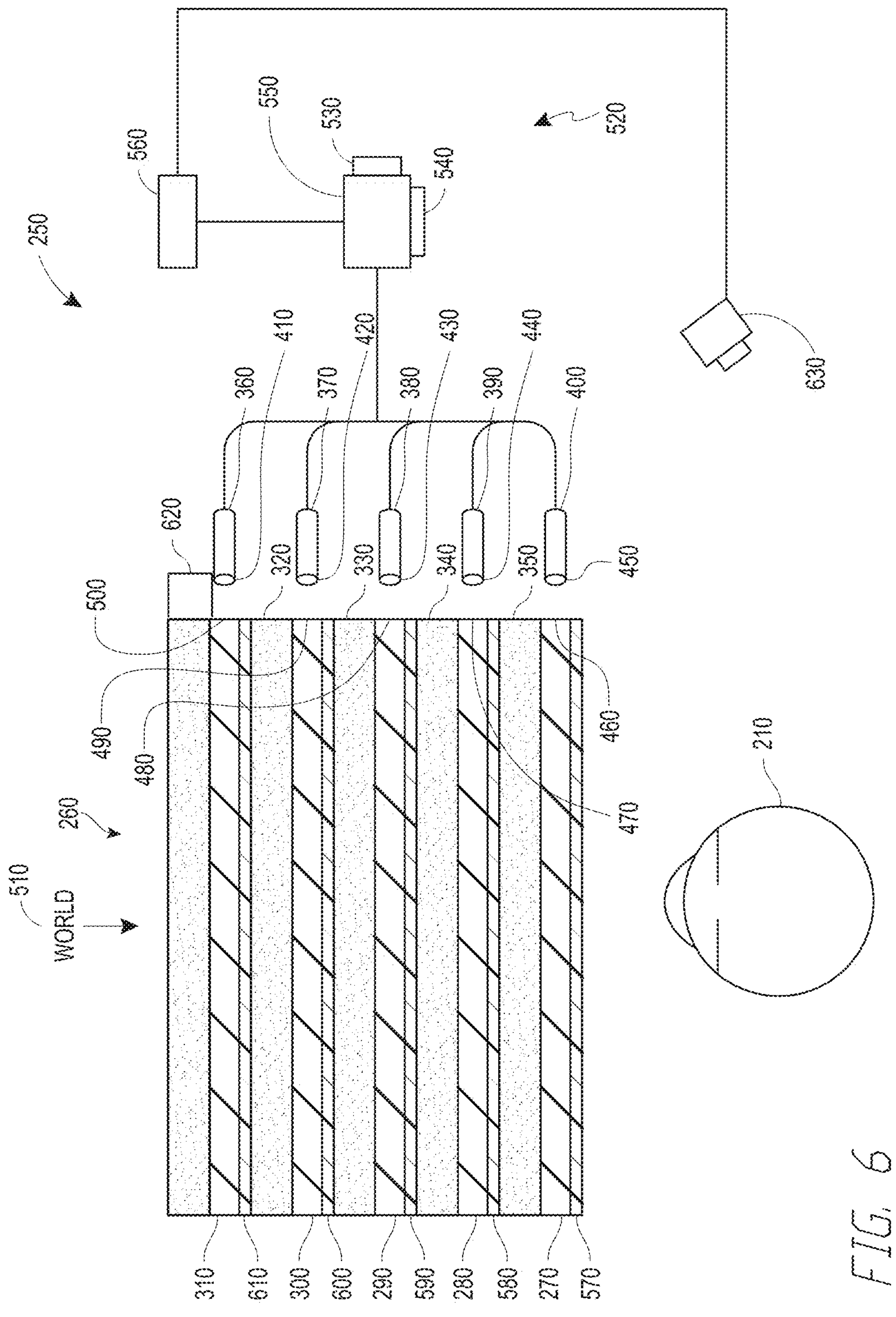
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with discrete amounts of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
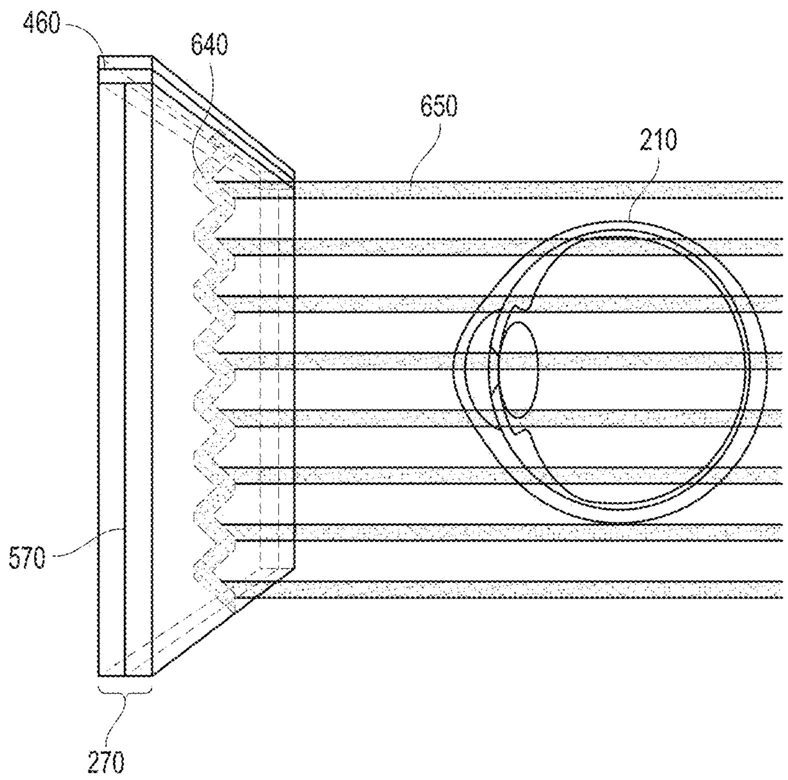
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
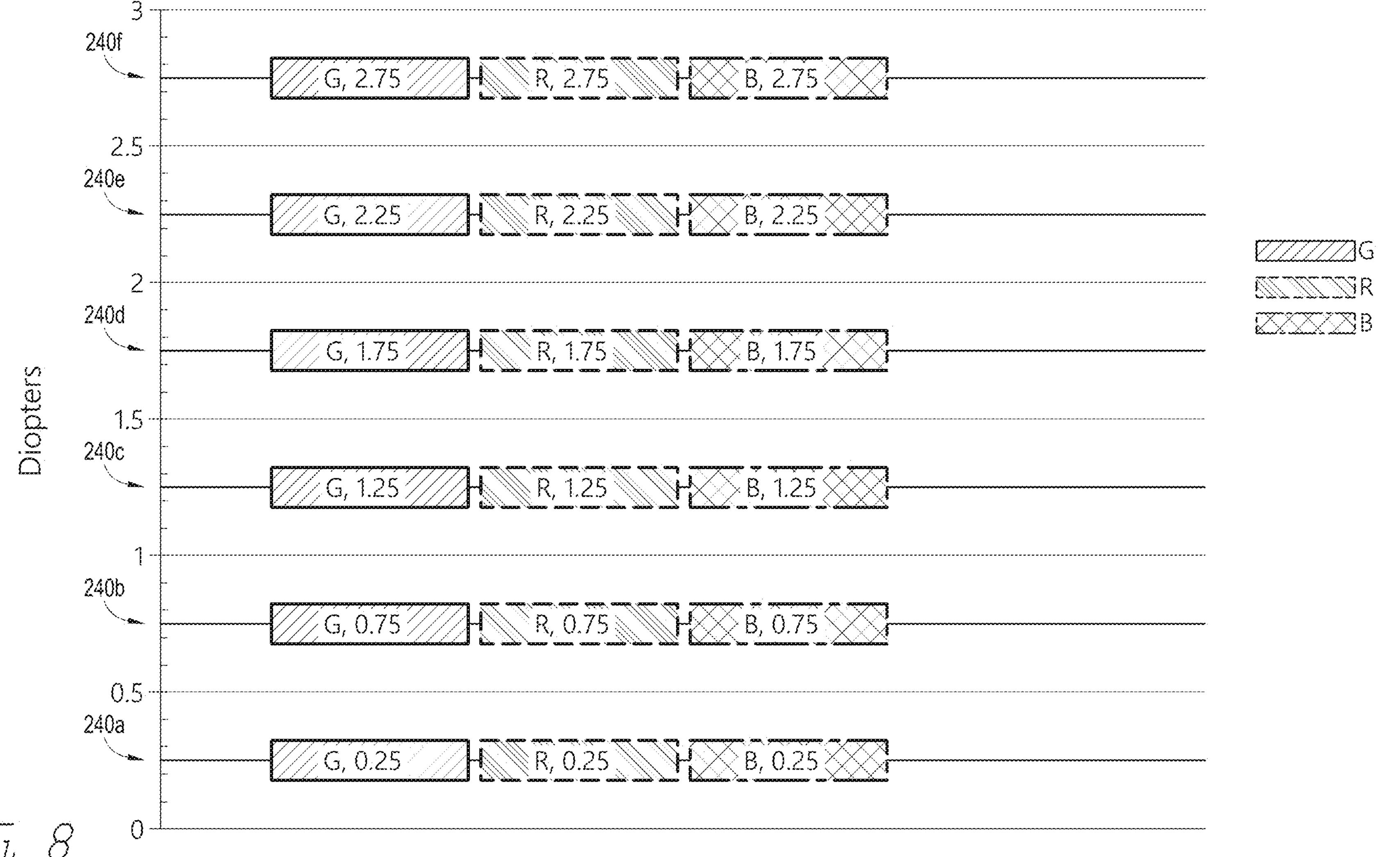
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240*a*-240*f*, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
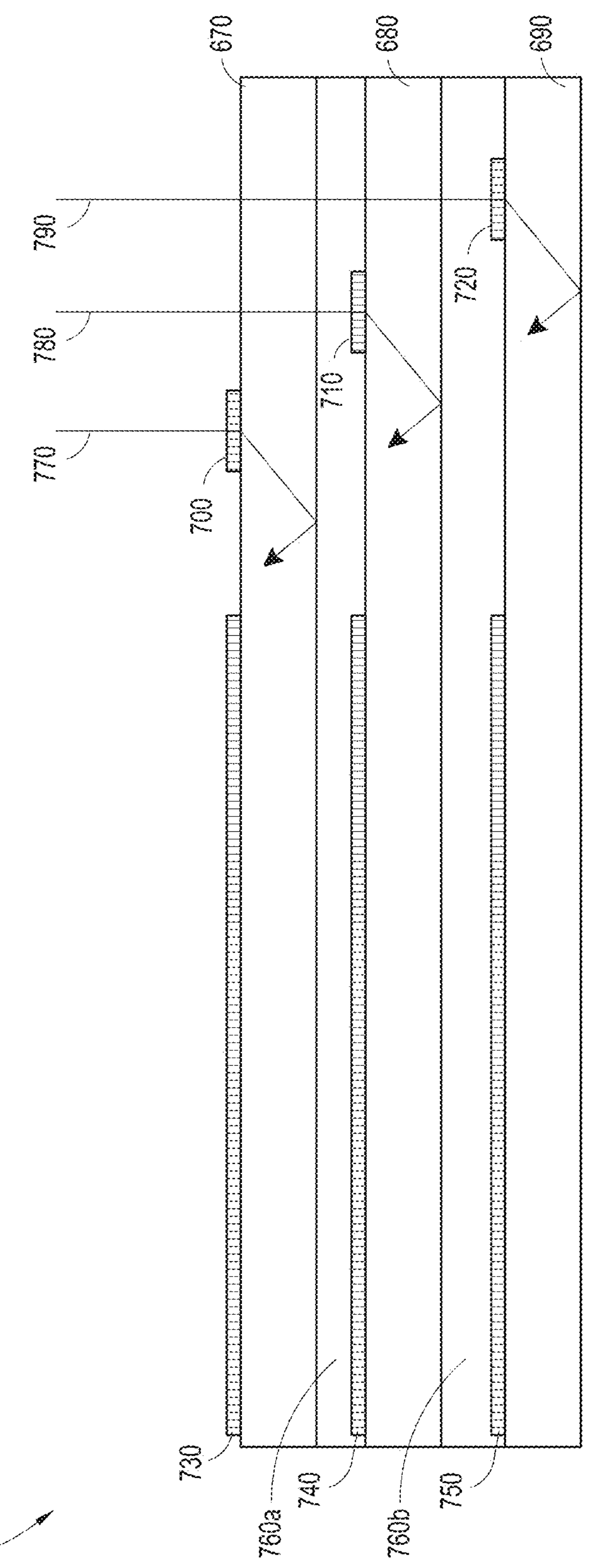
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760*a* may separate waveguides 670 and 680; and layer 760*b* may separate waveguides 680 and 690. In some embodiments, the layers 760*a* and 760*b* are formed of low refractive index materials (that is, materials having a lower refractive index than the material forming the immediately adjacent one of waveguides 670, 680, 690). Preferably, the refractive index of the material forming the layers 760*a*, 760*b* is 0.05 or more, or 0.10 or less than the refractive index of the material forming the waveguides 670, 680, 690. Advantageously, the lower refractive index layers 760*a*, 760*b* may function as cladding layers that facilitate total internal reflection (TIR) of light through the waveguides 670, 680, 690 (e.g., TIR between the top and bottom major surfaces of each waveguide). In some embodiments, the layers 760*a*, 760*b* are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760*a*, 760*b* are similar or the same. In some embodiments, the material forming the waveguides 670, 680, 690 may be different between one or more waveguides, and/or the material forming the layers 760*a*, 760*b* may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
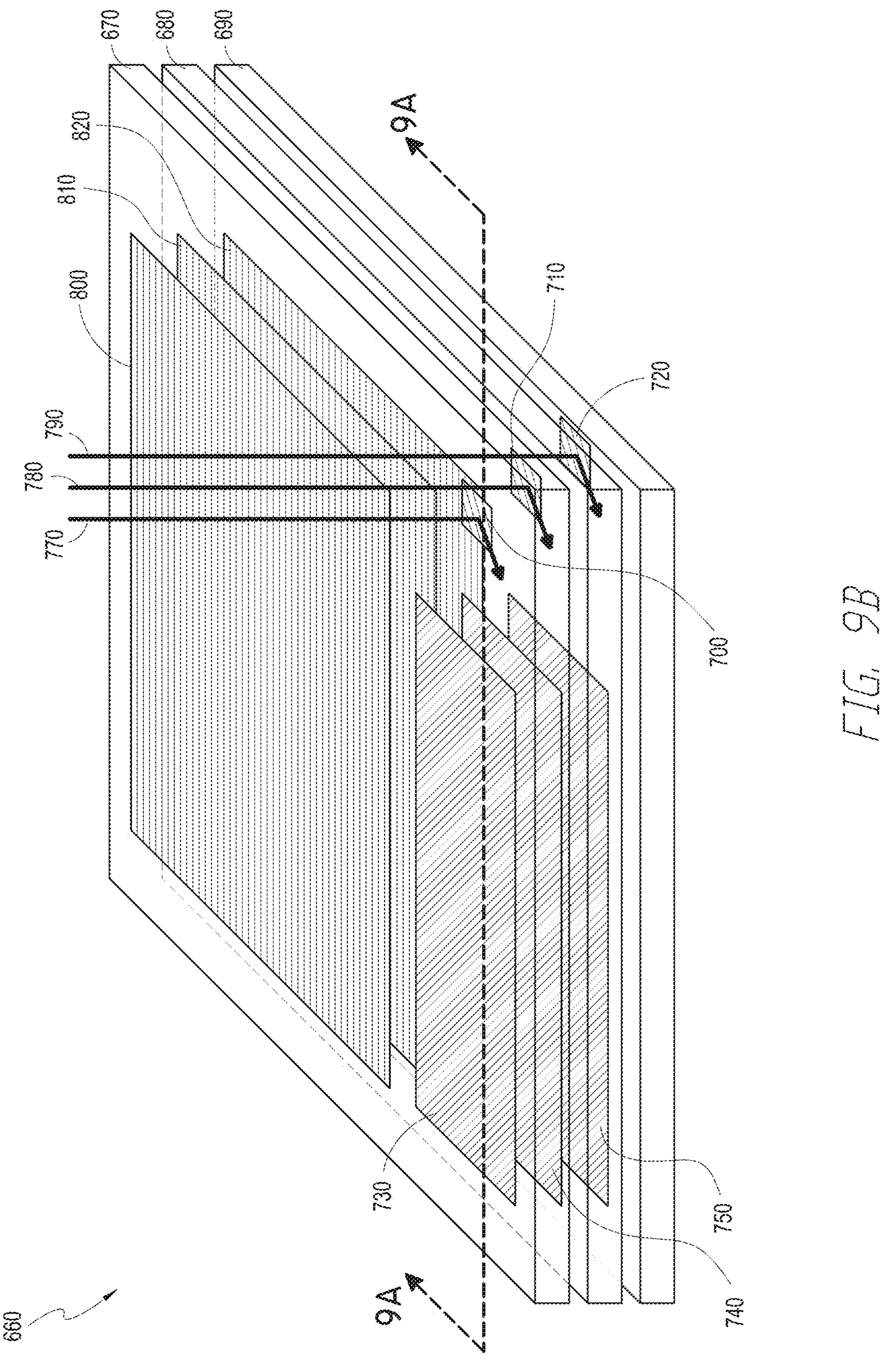
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
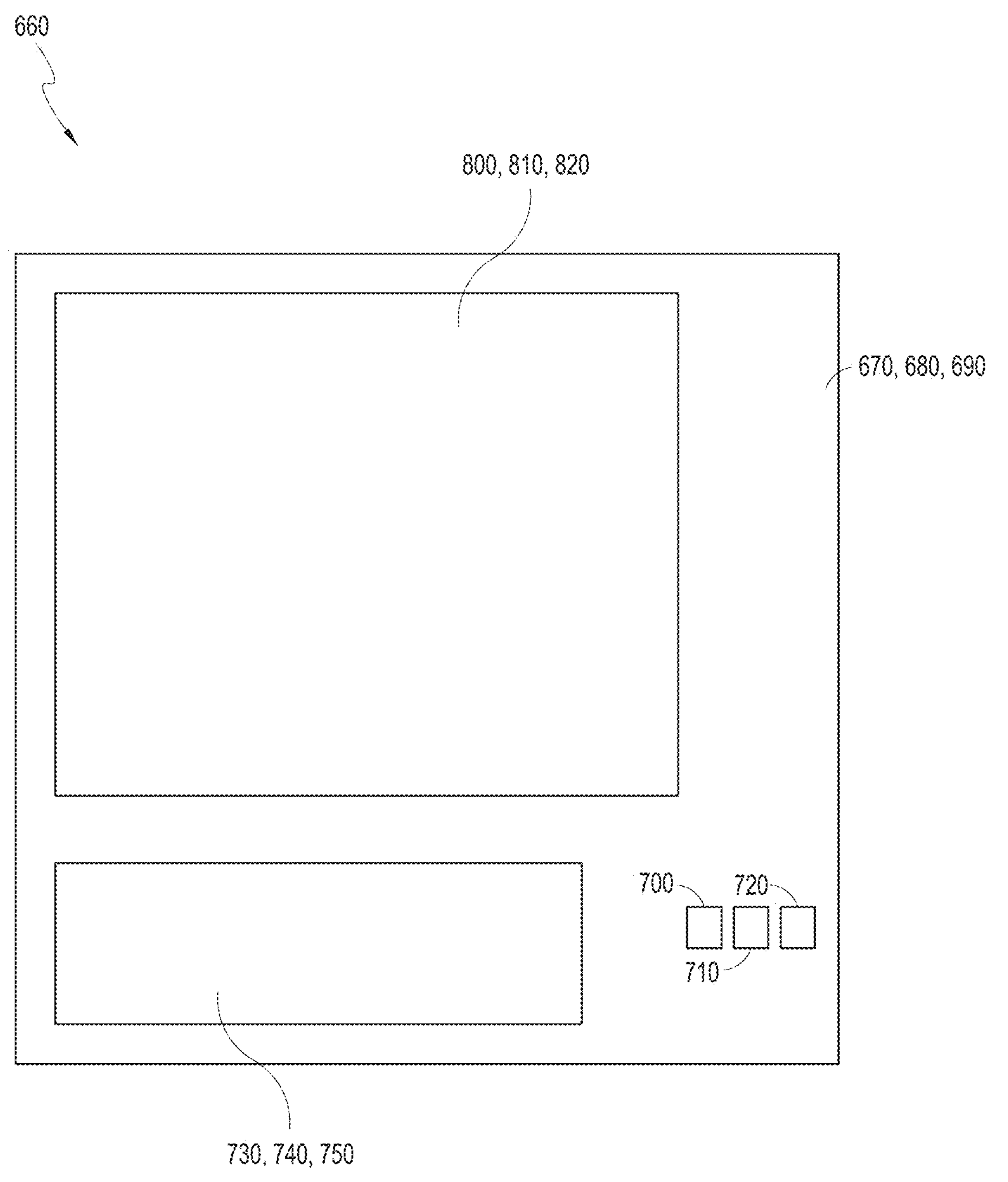
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
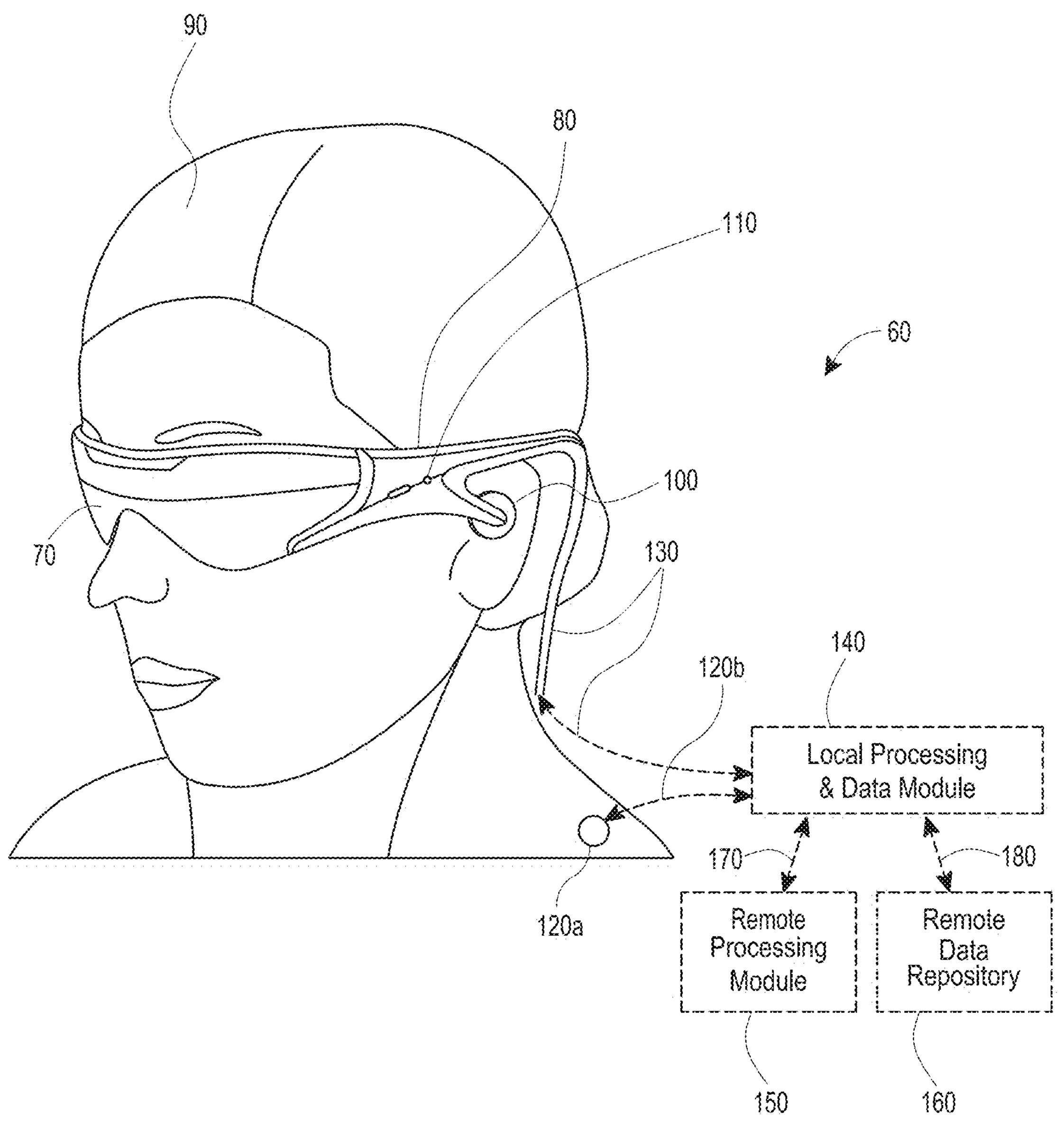
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120*a*, which may be separate from the frame 80 and attached to the body of the user 90 (e.g., on the head, torso, an extremity, etc. of the user 90). The peripheral sensor 120*a* may be configured to acquire data characterizing a physiological state of the user 90 in some embodiments. For example, the sensor 120*a* may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120*a* may be operatively coupled by communications link 120*b*, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Metasurfaces

Figures 10A, 10B:
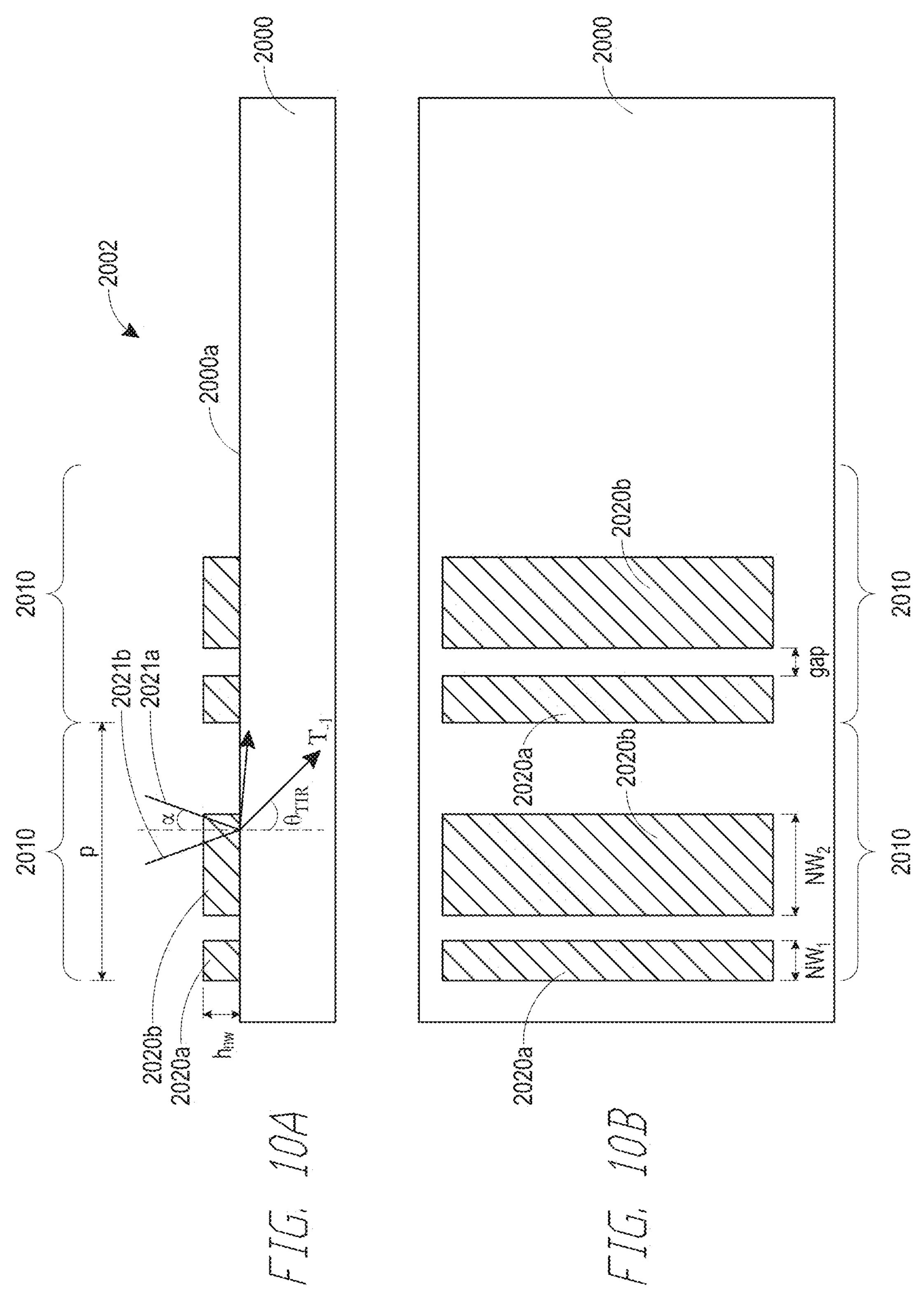
FIGS. 10A and 10B illustrate examples of cross-sectional side and top-down views, respectively, of a metasurface.

FIGS. 10A and 10B illustrate examples of cross-sectional side and top down views, respectively, of a metasurface 2002 according to some embodiments. A substrate 2000 has a surface 2000*a* on which a metasurface 2002 comprising a plurality of metasurface unit cells 2010 is disposed. The unit cells each include a plurality of nanobeams 2020*a*, 2020*b* formed of an optically transmissive material. The nanobeams 2020*a*, 2020*b* may be ridges (or nanowires), which are laterally elongated into and out of the page and define trenches between neighboring nanobeams. In some embodiments, the nanobeams 2020*a*, 2020*b* may be linear. Preferably, the nanobeams 2020*a*, 2020*b* are continuous along their lengths, which can have benefits for providing a high diffraction efficiency. In some other embodiments, the nanobeams 2020*a*, 2020*b* may be discontinuous along their lengths, e.g., the nanobeams 2020*a*, 2020*b* may each extend along a line, with gaps in the nanobeams 2020*a*, 2020*b* along those lines.

The unit cells 2010 may repeat at regular intervals across the surface 2000*a*, and may be parallel to one another such that the nanobeams 2020*a*, 2020*b* are also parallel to one another. The unit cells 2010 may have a width P, which is the distance between identical points of directly neighboring unit cells 2010. In some embodiments, P may be in the range of 10 nm to 1 μm, including 10 nm to 500 nm or 300 nm to 500 nm. It will be appreciated that P may be considered the pitch of the unit cells 2010 and may be substantially constant across a grating formed by those unit cells. In some other embodiments, P may vary across the surface 2000*a*.

Preferably, the refractive index of the material forming the nanobeams 2020*a*, 2020*b* is higher than the refractive index of the substrate 2000. In some embodiments, the substrate 2000 may be a waveguide, and may correspond to the waveguides 270, 280, 290, 300, 310 (FIG. 6) and/or waveguides 670, 680, and 690 (FIG. 9A). In such applications, the substrate preferably has a relatively high refractive index, e.g., 1.5, 1.6, 1.7, 1.8, 1.9, or higher, which can provide benefits for increasing the field of view of a display that forms an image by outputting light from that substrate 2000. Examples of materials for forming the substrate 2000 include glass (e.g., doped glass), lithium niobate, plastic, a polymer, sapphire, or other optically transmissive material. In some embodiments, the refractive index of the material forming the nanobeams 2020*a*, 2020*b* may be 2.0 or higher, 2.5 or higher, 3.0 or higher, 3.3 or higher, or 3.5 or higher. Examples of materials for forming the nanobeams 2020*a*, 2020*b* include silicon-containing materials (e.g., amorphous or polysilicon, and silicon nitride), oxides, and gallium phosphide. Examples of oxides include titanium oxide, zirconium oxide, and zinc oxide. Preferably, the material forming the nanobeams 2020*a*, 2020*b* is the same, which has advantages for simplifying fabrication of the metasurface 2002.

With continued reference to FIGS. 10A and 10B, one of the nanobeams 2020*b* has a width $NW_2$ that is larger than the width $NW_1$ of the other of the illustrated nanobeams 2020*a*. In some embodiments, the widths $NW_1$ and $NW_2$ are each in the range of 10 nm to 1 μm, including 10 nm to 300 nm, with $NW_1$ being greater than $NW_2$ as noted above. As illustrated, the nanobeams 2020*a*, 2020*b* may be separated by a gap in the range of 10 nm to 1 μm wide, including 10 nm to 300 nm wide. As also illustrated, the nanobeams 2020*a*, 2020*b* have a height $h_{nw}$, which may be in the range of 10 nm to 1 μm, including 10 nm to 450 nm. Preferably, the heights of the nanobeams 2020*a*, 2020*b* are substantially equal.

As disclosed herein, the various dimensions of features of the unit cells 2010 and nanobeams 2020*a*, 2020*b* may vary depending upon the properties of the materials used to form the metasurface 2002 and the properties of surrounding structures, such as the substrate 2000. In some embodiments, the height $h_{nw}$ of the nanobeams 2020*a*, 2020*b* may vary depending upon the refractive index of the material used for those nanobeams. In some embodiments, the heights of the nanobeams may be 10 nm to 450 nm where a refractive index of the material is more than 3.3; and 10 nm to 1 μm where the refractive index is 3.3 or less. As another example, the height of the nanobeams may be 10 nm to 450 nm where the nanobeams are formed of silicon (e.g., amorphous or polysilicon).

With continued reference to FIGS. 10A and 10B, the metasurface 2002 illustrated in these figures works in the transmissive mode. Light rays 2021*a*, 2021*b* are redirected upon propagating through the metasurface 2002 formed by the nanobeams 2020*a*, 2020*b*. As illustrated, the light ray 2021*a* is incident on the metasurface 2002 at an angle $\alpha$ relative to the normal to the surface 2000*a*. Preferably, the angle $\alpha$ is within the angular bandwidth for the metasurface 2002 such that the light ray 2021*a* is redirected by the metasurface 2002 to propagate within the substrate 2000 at angles that facilitate total internal reflection within that substrate 2000. As illustrated, the light ray 2021*b* is redirected such that it makes out an angle $\theta_{TIR}$ with the normal to the surface 2000*a*. Preferably, the angle $\theta_{TIR}$ is within a range of angles that facilitate total internal reflection within the substrate 2000. As disclosed herein, in some embodiments, the metasurface 2002 may be utilized as an incoupling optical element (e.g., as one or more of the incoupling optical elements 700, 710, 720 (FIG. 9A)) to incouple incident light such that the light propagates through the substrate 2000 via total internal reflection.

The metasurface 2002 will also deflect light impinging on it from within the substrate 2000. Taking advantage of this functionality, in some embodiments, the metasurfaces disclosed herein may be applied to form outcoupling optical elements, such as one or more of the outcoupling optical elements 570, 580, 590, 600, 610 (FIG. 6) or 800, 810, 820 (FIG. 9B) instead of, or in addition to, forming an incoupling optical element at different locations on the surface 2000*a*. Where different waveguides have different associated component colors, it will be appreciated that the outcoupling optical elements and/or the incoupling optical elements associated with each waveguide made have a geometric size and/or periodicity specific for the wavelengths or colors of light that the waveguide is configured to propagate. Thus, different waveguides may have metasurfaces with different geometric sizes and/or periodicities. As examples, the metasurfaces for incoupling or outcoupling red, green, or blue light may be have geometric sizes and/or periodicities (pitches) configured to redirect or diffract light at wavelengths of, e.g., 638 nm, 520 nm, and 455 nm, respectively. In some embodiments, the geometric size and periodicity of the nanobeams 2020*a*, 2020*b* and unit cells 2010 increases as wavelengths become longer, and the height or thickness of one or both of the nanobeams 2020*a*, 2020*b* also increase as wavelengths become longer.

In some embodiments, where the metasurface is 2002 are utilized as outcoupling optical elements, the metasurfaces 2002 may have geometric sizes and/or pitches that cause the metasurfaces to impart optical power onto the diffracted light. For example, the metasurfaces may be configured to cause light to exit the metasurface in diverging or converging directions. Different portions of the metasurface may have different pitches, which cause different light rays to deflect in different directions, e.g., so that the light rays diverge or converge.

In some other embodiments, the metasurface 2002 may redirect light such that the light propagates away from the metasurface 2002 as collimated rays of light. For example, where colliminated light impinges on the metasurface 2002 at similar angles, the metasurface 2002 may have consistent geometric sizes and a consistent pitch across the entirety of the metasurface 2002 to redirect the light at similar angles.

Figures 11A, 11B:
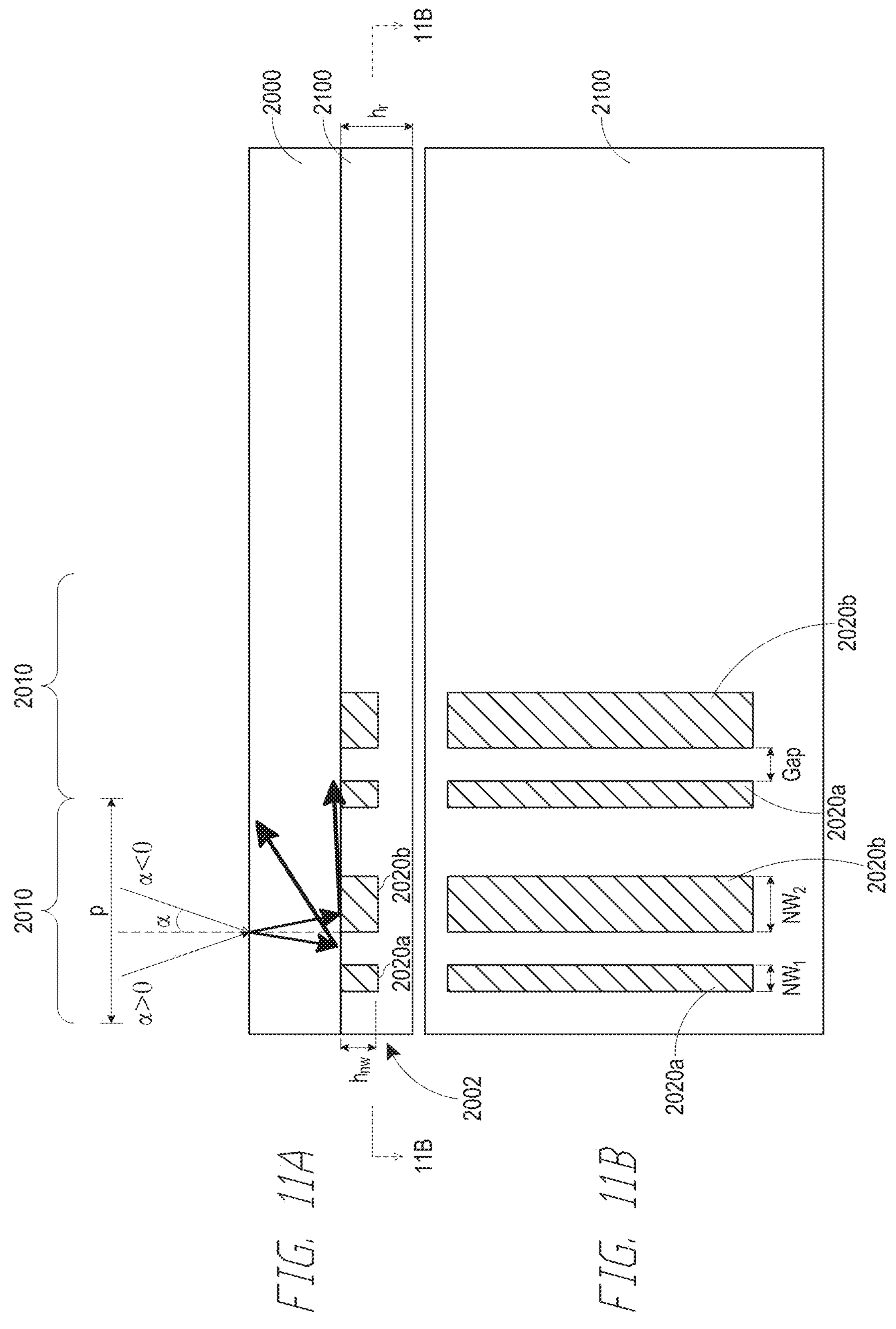
FIG. 11A illustrates an example of a cross-sectional side view of a metasurface configured to function in a reflective mode.
FIG. 11B illustrates an example of a cross-sectional, top-down view of the metasurface of FIG. 11A as viewed on the plane 11B of FIG. 11A.

With reference now to FIGS. 11A-11B, the metasurface 2002 may deflect light in a “reflective mode” where the redirected light remains on the same side of the metasurface 2002 before and after impinging on the metasurface. FIG. 11A illustrates an example of a cross-sectional side view of a metasurface configured to function in a reflective mode, and FIG. 11B illustrates an example of a cross-sectional, top-down view of the metasurfaces of FIG. 11A as viewed on the plane 11B. As shown, the nanobeams 2020*a*, 2020*b* of the metasurface 2002 may be embedded in a reflective layer 2100. The reflective layer 2100 may be formed of a reflective material, e.g., a metal, such as aluminum, silver, gold, and copper. Preferably, the material forming the reflective layer 2100 fills the spaces between the nanobeams 2020*a*, 2020*b* and between the unit cells 2010. In addition, the height or thickness $h_r$ of the reflective layer 2100 may be greater than the height $h_{nw}$ of the nanobeams 2020*a*, 2020*b*. In some embodiments, the height $h_r$ may be 150 nm or thicker, or 1 μm or thicker. Preferably, the reflective layer 2100 is sufficiently thick to block incident light, with $h_r$ being greater than the optical depth of the layer 2100. It will be appreciated that the ranges of the dimensions of the various features forming a unit cell 2010 are similar to that discussed herein with respect to FIGS. 10A and 10B.

Figures 12, 13:
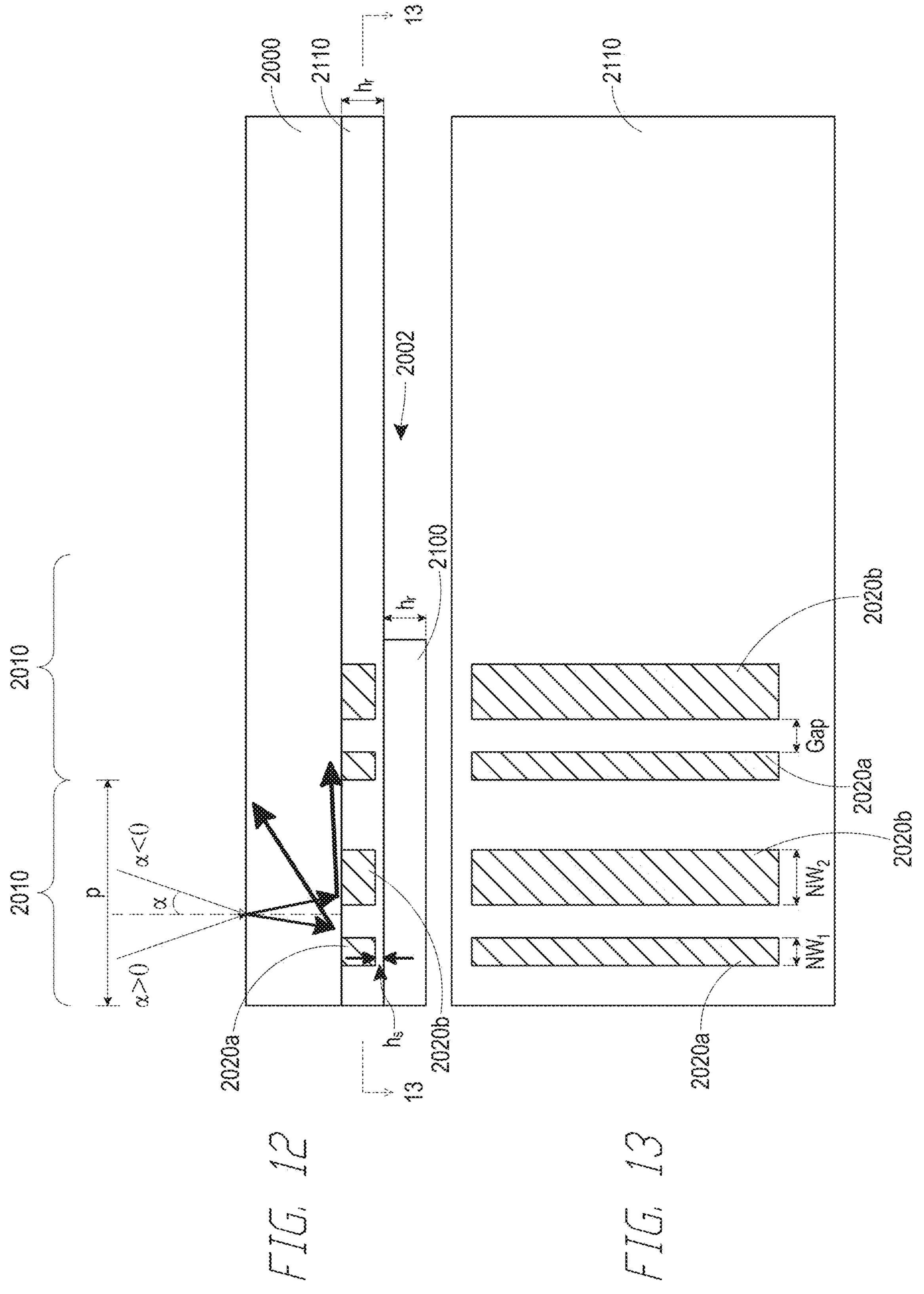
FIG. 12 illustrates an example of a cross-sectional side view of another metasurface configured to function in a reflective mode.
FIG. 13 illustrates an example of a cross-sectional, top-down view of the metasurface of FIG. 12 as viewed on the plane 13 of FIG. 12.

With reference now to FIGS. 12-13, another example of a reflective mode metasurface is illustrated. FIG. 12 illustrates an example of a cross-sectional side view of the metasurface 2002 configured to function in a reflective mode, and FIG. 13 illustrates an example of a cross-sectional, top-down view of the metasurface of FIG. 12 as viewed on the plane 13 of FIG. 13. As illustrated, the nanobeams 2020*a*, 2020*b* are embedded in an optically transmissive spacer layer 2110. In these embodiments, the reflective layer 2100 is disposed directly on the surface of the spacer layer 2110 opposite the substrate 2000. The spacer layer 2110 has a height or thickness $h_{s1}$ which is greater than the height of the nanobeams 2020*a*, 2020*b* by a height $h_s$, thereby spacing the nanobeams 2020*a*, 2020*b* from reflective layer 2100 by a distance equal to $h_s$. In some embodiments, the height $h_s$ may be within the range of 5 nm to 1 μm, including 10 nm to 300 nm. It will be appreciated that examples of suitable materials for the spacer layer 2100 can include material that may be deposited by spin on coat, including poly(methyl methacrylate) (PMMA), spin-on glass, e-beam resist or photo-resist, and polymer. In some embodiments, the spacer layer has a refractive index of 1 to 2.

In some embodiments, the substrate 2000 may be provided with both transmissive metasurfaces and reflective metasurfaces. FIG. 14A illustrates an example of a cross-sectional side view of the substrate 2000 having transmissive and reflective metasurfaces 2002*a*, 2002*b*, respectively. In some embodiments, the transmissive and reflective metasurfaces 2002*a*, 2002*b* may be on opposing sides of the substrate. FIG. 14B illustrates an example of a top-down view of the metasurface 2002*a* of FIG. 14A. FIG. 14C illustrates an example of a top-down view of the metasurface 2002*b* of FIG. 14A viewed on the plane 14C of FIG. 14A.

With reference to FIG. 14A, metasurface 2002*a* includes a plurality of unit cells 2010*a* which include nanobeams 2020*a*, 2020*b*. Similarly, the metasurface 2002*b* includes a plurality of unit cells 2010*b* which include nanobeams 2020*c*, 2020*d*. As with the nanobeams 2020*a*, 2020*b*, one of the nanobeams 2020*c*, 2020*d* is wider than the other. As disclosed herein, the dimensions of the features of the unit cells 2010*a*, 2010*b* may be selected based upon the wavelengths of light that the metasurfaces are configured to redirect, and the desired degree of redirection. Where the metasurface is are configured to redirect light of different wavelengths, the widths of the nanobeams 2020*a* and 2020*c* may be different from one another, and/or the widths of the nanobeams 2020*b* and 2020*d* may be different from one another. For example, the metasurface 2002*a* may be configured to redirect light corresponding to the color green, while the metasurface 2002*b* may be configured to redirect light corresponding to the color red. In some embodiments, such an arrangement in which each metasurface is configured to redirect light of a different range of wavelengths may advantageously reduce the size of a waveguide stack in which different waveguides are used to propagate light of different wavelengths. Advantageously, the metasurfaces 2002*a*, 2002*b* may be used as incoupling optical elements and/or outcoupling optical elements to allow a single waveguide to be used to guide light corresponding to different component colors, thereby avoiding the use of one waveguide.

As illustrated, the metasurface 2002*a* functions in the transmissive mode and selectively redirects light ray 2040*a*, while allowing light ray 2040*b* to propagate through the metasurface without being redirected. The light ray 2040*b* then impinges on the reflective-mode metasurface 2002*b*, which reflects the light ray 2040*b* such that it propagates in a desired direction (which is different from the direction expected for a specular reflector).

Figures 15A, 15B, 15C, 15D, 15E:
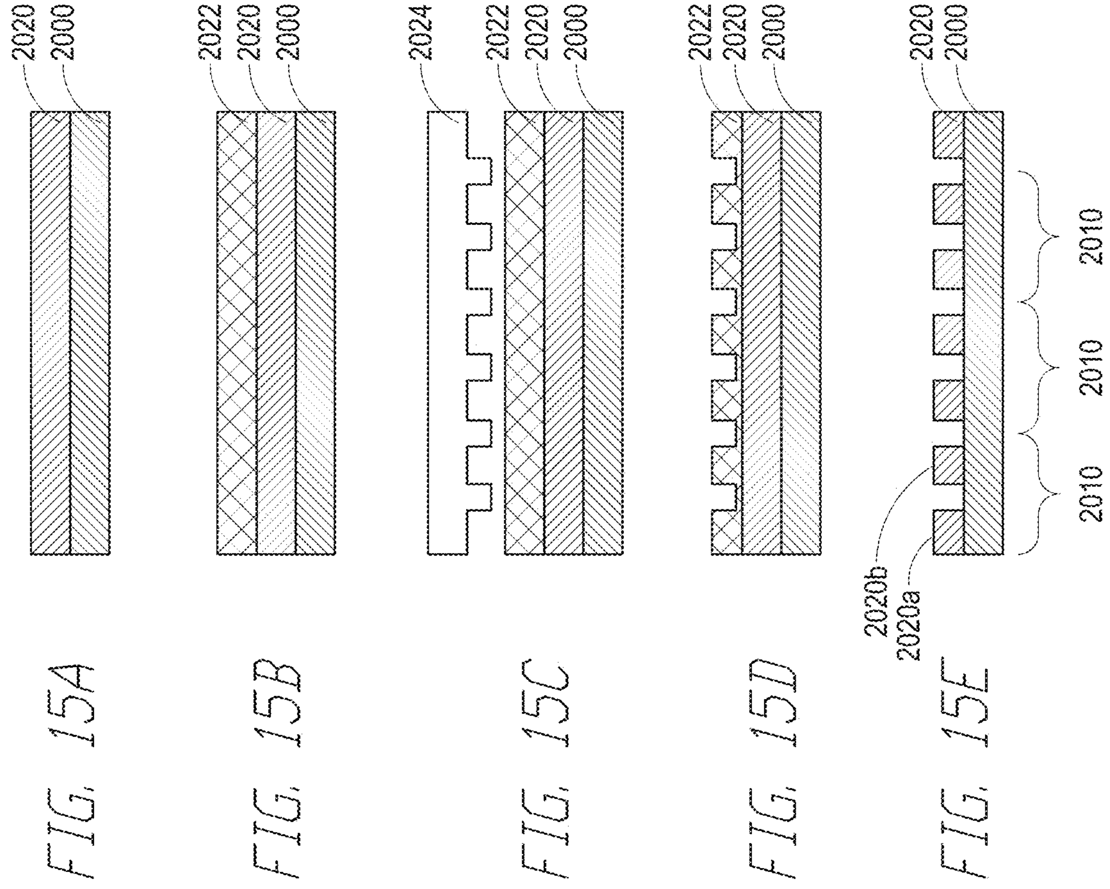
FIGS. 15A-15E illustrate an example of a process flow for forming a metasurface.

With reference now to FIGS. 15A-15E, an example of a process flow for forming a transmissive metasurface is illustrated. With reference to FIG. 15A, a layer 2020 of an optically transmissive material for forming the nanobeams 2020*a*, 2020*b* is deposited on the substrate 2000. The deposition may be accomplished using, e.g., a vapor deposition process such as chemical vapor deposition (CVD), including plasma-enhanced chemical vapor deposition. Subsequently, with reference to FIG. 15B, a selectively definable material, e.g., a resist (such as a nanoimoprint resist) is deposited on the layer 2022. The resist 2022 may be deposited by jet coating (e.g., inkjet printing), which may provide advantages for forming exceptionally thin layers, and also layers with varying composition and/or thickness.

With reference to FIG. 15C, an imprint template or master 2024 is brought into contact with the resist 2022 to pattern that resist. In some other embodiments, the pattern in the imprint template 2024 may be formed by, e.g., lithography, including e-beam lithography or EUV lithography.

With reference to FIG. 15D, the pattern formed in the resist layer 2022 is transferred to the optically transmissive layer 2020. It will be appreciated that this pattern transfer may be accomplished using an etch selective for the material forming the optically transmissive layer 2020 relative to other exposed materials. In some embodiments, the pattern transfer etch may be an anisotropic etch, such as a reactive ion etch. Subsequently, in some embodiments, the resist layer 2022 may be removed using, e.g., an ashing process.

With reference now to FIG. 15E, a plurality of unit cells 2010 comprising nanobeams 2020*a*, 2020*b* are formed. It will be appreciated that while shown schematically as having similar widths for ease of illustration, the nanobeams 2020*a*, 2020*b* have different widths, as disclosed herein.

Figures 16A, 16B:
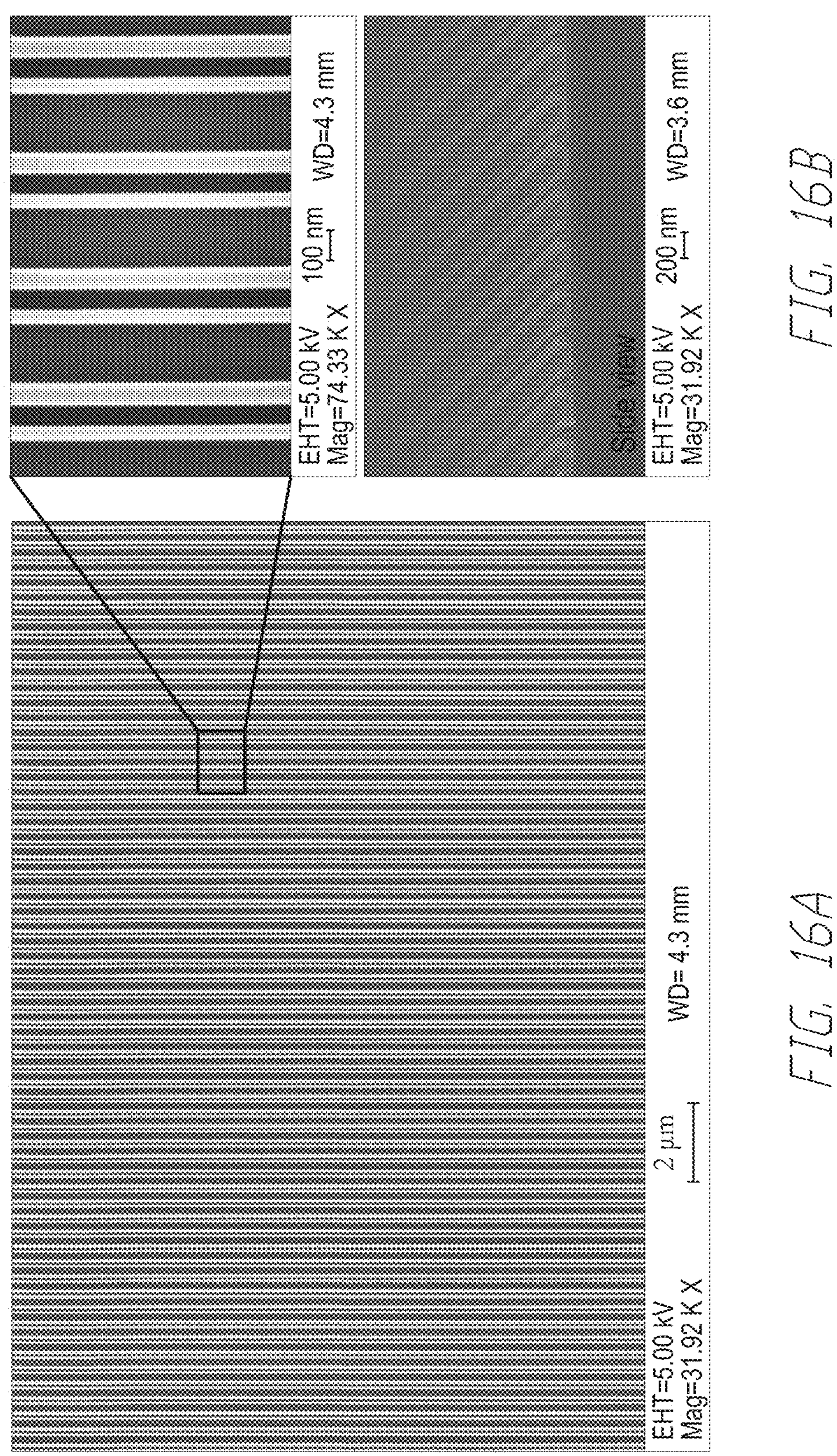
FIGS. 16A and 16B illustrate scanning electron micrographs of a metasurface.

FIGS. 16A and 16B illustrate scanning electron microscope images of a metasurface. The metasurface was formed generally as described with respect to FIGS. 15A-15E, with the resist being patterned by electron beam lithography. Advantageously, highly uniform rows of material corresponding to the nanobeams 2020*a*, 2020*b* were formed. As shown in FIG. 16B, each nanobeam has a substantially uniform cross-sectional shape, as seen in the illustrated side view.

While not illustrated, it will be appreciated that reflective-mode metasurfaces may be formed through additional processing of the structure shown in FIG. 15E. For example, a reflective material may be deposited in the open volumes between the nanobeams 2020*a*, 2020*b*, and over those nanobeams to form the structure illustrated in FIGS. 11A and 11B. In some other embodiments, the nanobeams 2020*a*, 2020*b* may be formed by etching trenches in the reflective layer and subsequently filling the trenches with the material of the nanobeams 2020*a*, 2020*b*.

As another example, the structure illustrated in FIG. 12 may be formed by depositing a layer of optically-transmissive spacer material on and between the nanobeams 2020*a*, 2020*b*. The reflective layer may subsequently be deposited on the spacer layer. In some embodiments, the depositions may be accomplished using vapor deposition processes, e.g., chemical vapor deposition (CVD) processes and/or physical vapor deposition (PVD) processes.

Figure 17:
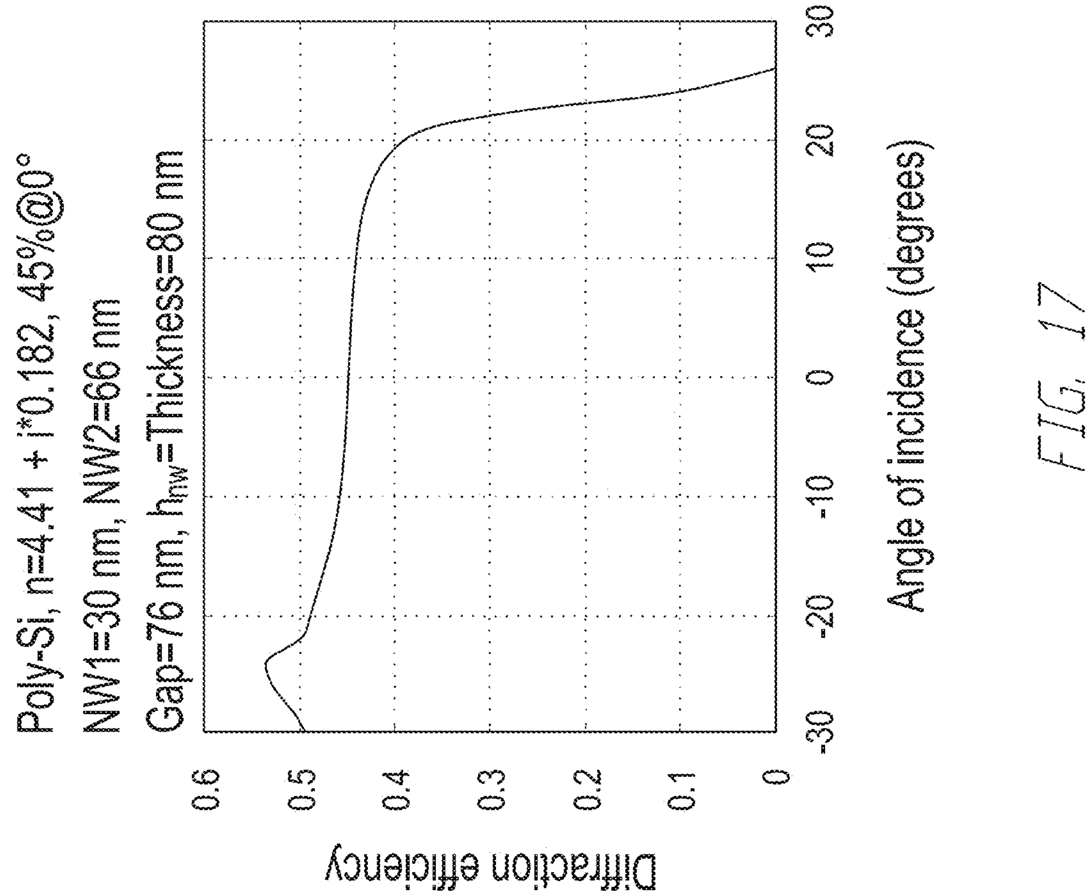
FIG. 17 illustrates an example of a plot showing the diffraction efficiency versus angle of incidence of light for a transmissive metasurface.

As discussed herein, metasurfaces according to various embodiments provide highly uniform diffraction efficiency over a wide range of innocent angles. FIG. 17 illustrates an example of a plot showing the diffraction efficiency versus angle of incidence of light for a transmissive metasurface. Advantageously, the diffraction efficiency over a span of angles ranging about 50° is highly uniform.

Figures 18A, 18B, 18C:
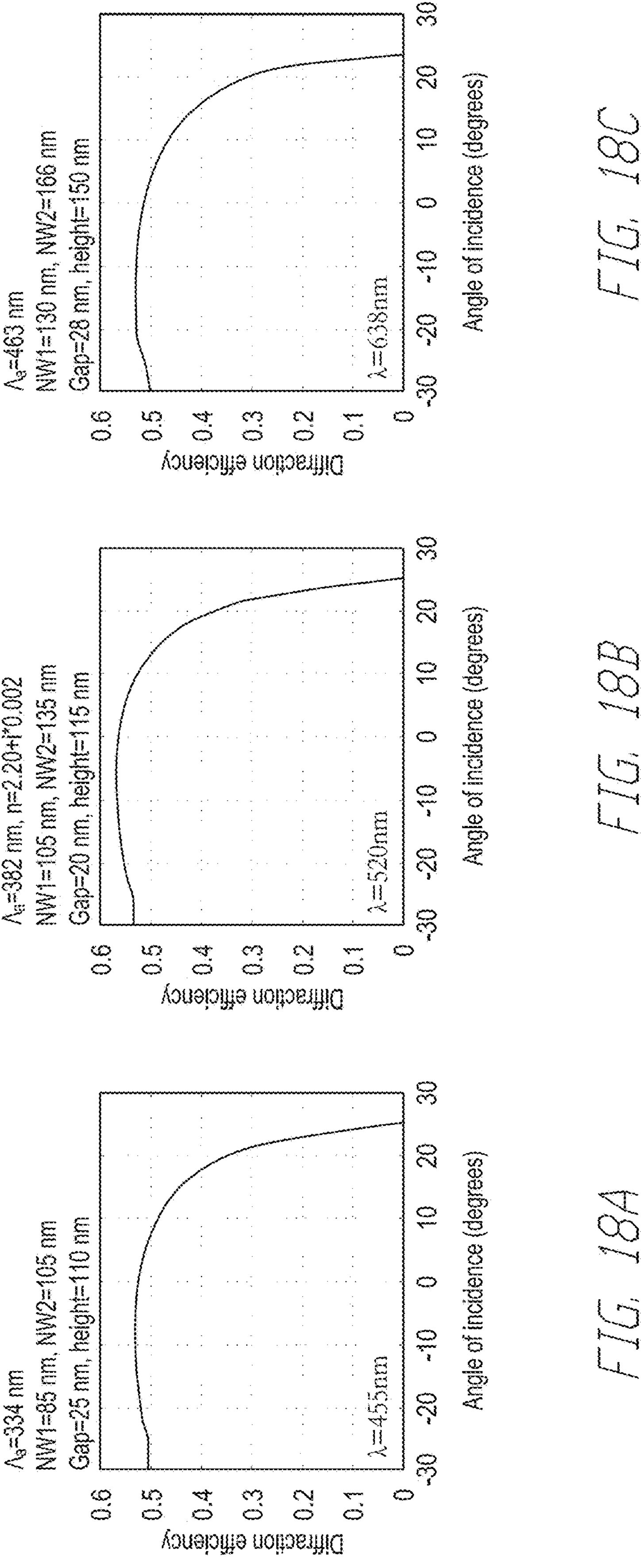
FIGS. 18A-18C illustrate examples of plots showing the diffraction efficiency versus angle of incidence of light for a reflective metasurface. The wavelengths of incident light are different for each of FIGS. 18A-18C.

High uniformity is also provided by various embodiments of a reflective metasurface. FIGS. 18A-18C illustrate examples of plots showing the diffraction efficiency versus angle of incidence of light for a reflective metasurface. The wavelengths of incident light are different for each of FIGS. 18A-18C. Advantageously, the plots are highly flat over a large range of incident angles. In addition, the plots are advantageously similar for different wavelengths corresponding to the colors red, green, and blue. Such uniformity may be beneficially applied to display systems which utilize different component colors. The uniformity of the diffraction may aid in the formation of high quality images with high color accuracy.

Figure 19B:
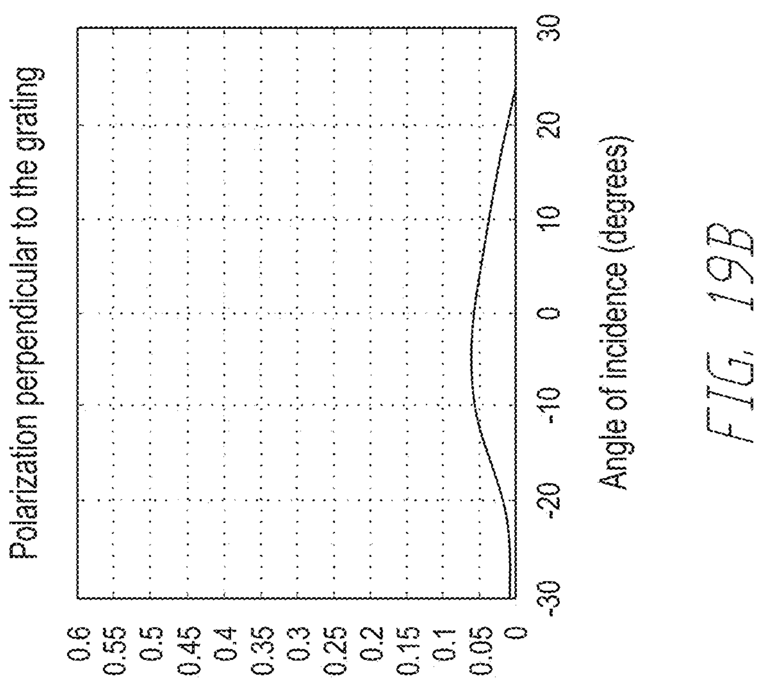
FIGS. 19A and 19B illustrate examples of plots showing the polarization sensitivity of the metasurface of FIGS. 10A and 10B.
Figure 19A:
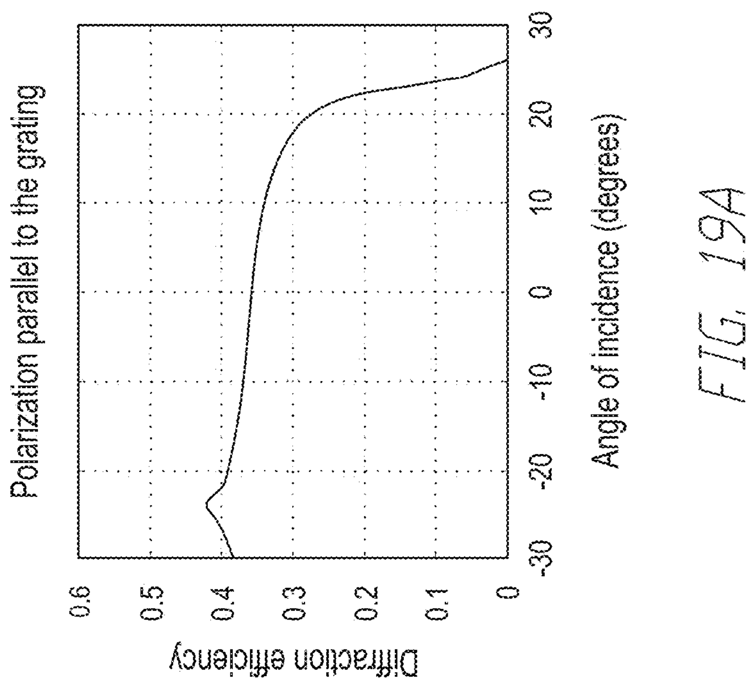

It has also been found that the diffraction efficiency of the metasurfaces is highly dependent upon the polarization of the instant light. FIGS. 19A and 19B illustrate examples of plots showing the polarization sensitivity of the transmissive metasurface of FIGS. 10A and 10B. As shown in FIG. 19A, the diffraction efficiency is high for incident light with a polarization that is parallel to the nanobeams forming the asymmetric rating. However, light with a polarization that is perpendicular to the nanobeams has low diffraction efficiency. Given this sensitivity to polarization, as noted herein, the metasurface may advantageously be utilized as a polarizing beam splitter. Preferably, the metasurface provides extinction ratios of 5 or more, 7 or more, or 9 or more for light of different polarizations.

Figure 20:
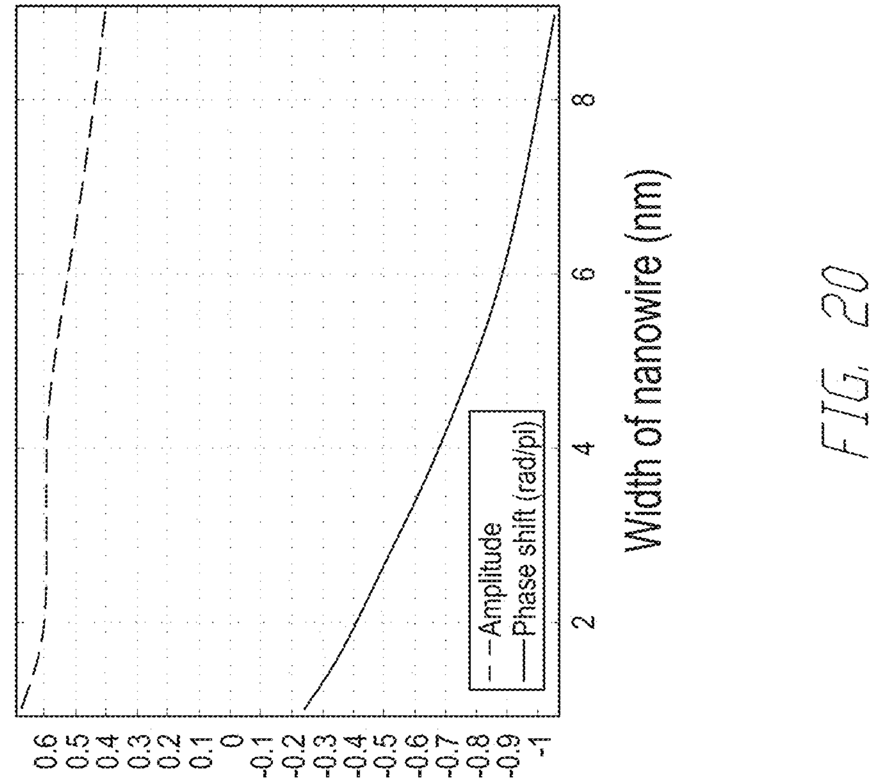
FIG. 20 illustrates plots of amplitude and phase shift versus nanobeam width for the metasurface of FIGS. 10A and 10B.

As discussed herein, the amplitude and phase of light redirected by the metasurfaces disclosed herein are dependent upon the widths of the nanobeams forming the metal surfaces. FIG. 20 illustrates plots of amplitude and phase shift versus nanobeam width for the metasurface of FIGS. 10A and 10B. As indicated by the plots, the widths of the nanobeams or nanowires may be adjusted to manipulate the amplitude and phase of the redirected light.

Figures 21A, 21B:
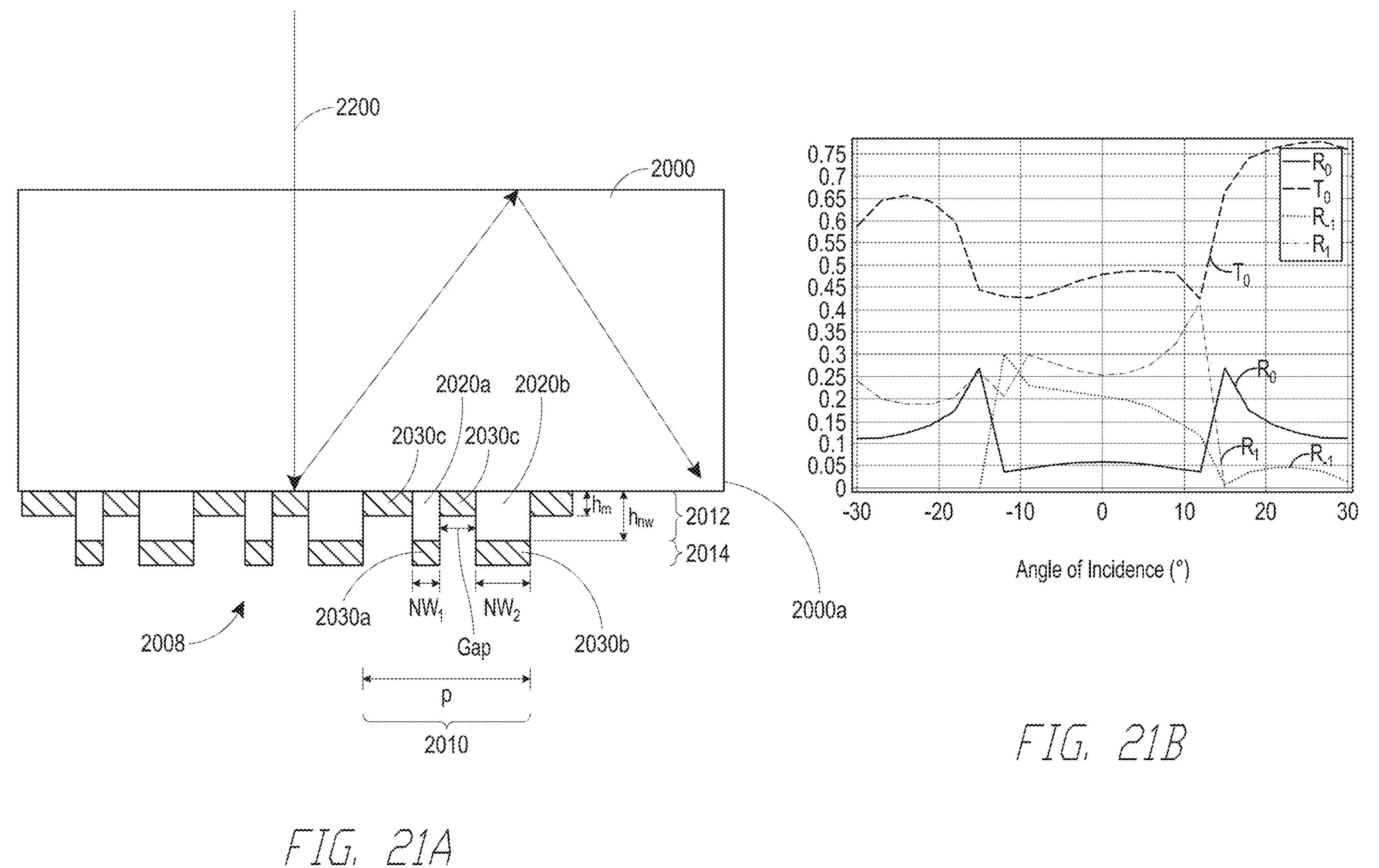
FIG. 21A illustrates an example of a cross-sectional side view of a multilevel metasurface.
FIG. 21B illustrates an example of a plot of transmission and reflection as a function of the angle of incidence of light for an optical structure having the general structure shown in FIG. 21A.

With reference now to FIG. 21A, in some embodiments, the metasurface may include a multilevel asymmetric grating. FIG. 21A illustrates an example of a cross-sectional side view of a multilevel metasurface 2008 that includes a plurality of levels of optically transmissive materials. It will be appreciated that the cross-sectional side view is taken on a plane orthogonal to the elongate axis of the illustrated nanobeams 2020*a*, 2020*b*. Nanobeams 2020*a*, 2020*b* are formed on the surface 2000*a* of the substrate 2000. As illustrated, in some embodiments, the metasurface 2008 is a bi-level structure having lowermost and uppermost levels 2012, 2014, respectively. The lowermost level 2012 includes the nanobeams 2020*a*, 2020*b* formed of a first optically transmissive material and masses 2030*c* of a second optically transmissive material between the nanobeams 2020*a*, 2020*b*. The uppermost level 2014 may be directly vertically adjacent the nanobeams 2020*a*, 2020*b* and includes uppermost level nanobeams 2030*a* of the second optically transmissive material formed directly on the nanobeams 2020*a* and uppermost level nanobeams 2030*b* of the second optically transmissive material formed directly on the nanobeams 2020*b*. It will be appreciated that the uppermost level nanobeams 2030*a*, 2030*b* of the second optically transmissive material may contact the nanobeams 2020*a*, 2020*b*. As illustrated, on the uppermost level 2014, the nanobeams 2030*a*, 2030*b* of the second optically transmissive material may be localized on the surface of the nanobeams 2020*a*, 2020*b*, forming plateaus of material spaced apart from other localized deposits (or plateaus) of the second optically transmissive material.

With continued reference to FIG. 21A, preferably, the refractive index of the second optically transmissive material forming the nanobeams 2030*a*, 2030*b* and masses 2030*c* is higher than the refractive index of both the first optically transmissive material forming the nanobeams 2020*a*, 2020*b*, and the material forming the substrate 2000. In some embodiments, the refractive index of the first optically transmissive material forming the nanobeams 2020*a*, 2020*b* is lower than or similar to the refractive index of the material forming the substrate 2000.

With continued reference to FIG. 21A, the first optically transmissive material of the nanobeams 2020*a*, 2020*b* is preferably a material that may be patterned, e.g., by lithography and etch processes. More preferably, the first optically transmissive material is a nanoimprint resist that may be patterned by nanoimprinting. As discussed herein, the second optically transmissive material forming the nanobeams 2030*a*, 2030*b* and masses 2030*c* may have a higher refractive index than both the first optically transmissive material of the nanobeams 2020*a*, 2020*b* and the material forming the substrate 2000. In some embodiments, the refractive index of the second optically transmissive material is higher than 1.6, 1.7, 1.8, or 1.9. Examples of materials for the second optically transmissive material include semiconductor materials, including silicon-containing materials, and oxides. Examples of silicon-containing materials include silicon nitride and silicon carbide. Examples of oxides include titanium oxide, zirconium oxide, and zinc oxide. In some embodiments, the second optically transmissive material may have lower optical transparency than these oxides. For example, the second optically transmissive material may be silicon or its derivatives. In some embodiments, the first and second optically transmissive materials are amorphous solid state materials, or crystalline solid state materials. Without being limited by theory, amorphous materials may be desirable in some applications, since they may be formed at lower temperatures and over a wider range of surfaces than some crystalline materials. In some embodiments, each of the first and second optically transmissive materials forming the features 2020*a*, 2020*b*, 2030*a*, 2030*b*, 2030*c* may be one of an amorphous or crystalline semiconductor material.

As discussed above, in some embodiments, the widths $NW_1$, $NW_2$ of the nanobeams 2020*a*, 2020*b*, respectively, forming the unit cells 2010 may be in the range of 10 nm to 1 μm, including nm to 300 nm or 10 nm to 250 nm. The nanobeams 2020*a*, 2020*b* of a unit cell 2010 may be separated by a gap in the range of 5 nm to 1 μm wide, including 10 nm to 1 μm wide or 10 nm to 300 nm wide. The pitch P of the unit cells 2010 may be in the range of 10 nm to 1 μm, including 10 nm to 500 nm, or 300 nm to 500 nm. In some embodiments, the heights $h_{nw}$ of the nanobeams 2020*a*, 2020*b* may be in the range of 10 nm to 1 μm, including 10 nm to 500 nm or 10 nm to 450 nm. The heights $h_m$ of the masses 2030*c* may be in the range of 10 nm to 1 μm, including 10 nm to 600 nm. Preferably, the heights of the nanobeams 2030*a*, 2030*b* and masses 2030*c* are substantially similar.

It has been found that the dimensions of features of the unit cells may vary depending upon the properties of the materials used to form the metasurface. For example, the height of the nanobeams may vary depending upon the refractive index of the material used for those nanobeams. In some embodiments, the heights of the nanobeams may be 10 nm to 450 nm where a refractive index of the material is more than 3.3; and 10 nm to 1 μm where the refractive index is 3.3 or less. As another example, the height of the nanobeams may be 10 nm to 450 nm where the nanobeams are formed of silicon (e.g., amorphous or polysilicon). In some embodiments, the heights of the material of the nanobeams 2030*a*, 2030*b* and masses 2030*c* may be in the range of 10 nm to 1 μm, including 10 nm to 600 nm.

Within the above noted ranges of dimensions, it will be appreciated that, in some embodiments, the metasurface may function in a primarily reflective mode or a primarily transmissive mode, depending upon the appropriate selection of dimensions in conjunction with materials for the features 2030*a*, 2030*b*, 2030*c*. For example, for a given wavelength of light, the thickness of the features 2030*a*, 2030*b*, 2030*c* for a metasurface 2008 working in the reflective mode may be lower than the thickness of the features 2030*a*, 2030*b*, 2030*c* for a metasurface working in the transmissive mode. In addition, in either the transmissive or reflective mode, the use of a higher refractive index material for the features 2030*a*, 2030*b*, 2030*c* may allow a reduction in the thickness of those features while achieving similar light redirecting properties.

With continued reference to FIG. 21A, the metasurface 2008 is working in the reflective mode, with incident light ray 2200 impinging on the metasurface 2008 and being redirected by diffraction at an angle such that it propagates through the substrate 2000 by total internal reflection. In some embodiments, the heights of the features 2030*a*, 2030*b*, 2030*c* may be lower than the heights of the nanobeams 2020*a*, 2020*b*, as illustrated. It will be appreciated that light may be understood to pass twice through metasurfaces working in the reflective mode (once as the incident light impinges on the metasurface, and a second time as it is reflected through and away from the metasurface), thereby allowing for features 2030*a*, 2030*b*, 2030*c* and nanobeams 2020*a*, 2020*b* with lower heights than a metasurface working in the transmissive mode with similar light redirecting capabilities.

With reference now to FIG. 21B, an example is illustrated of a plot of transmission and reflection as a function of the angle of incidence of light for a metasurface having the general structure shown in FIG. 21A. Various diffraction orders of transmitted and reflected light are indicated by "T" and "R," respectively. In this example, the nanobeams 2020*a*, 2020*b* are formed of an optically transmissive resist and the features 2030*a*, 2030*b*, 2030*c* are formed of titanium oxide. Titanium oxide has an advantageously high refractive index of 2.6, which can facilitate reductions in the thicknesses or heights of the features 2030*a*, 2030*b*, 2030*c* and nanobeams 2020*a*, 2020*b* relative to lower refractive index materials. For each unit cell, the width of the nanobeam 2020*a* is 50 nm; the width of the nanobeam 2020*b* is 110 nm; the gap between the nanobeams 2020*a* and 2020*b* is 40 nm; the heights of the nanobeams 2020*a*, 2020*b* are 100 nm; the heights of the features 2030*a*, 2030*b*, 2030*c* are 50 nm; and the pitch of the unit cells 2010 is 382 nm.

Figures 22A, 22B:
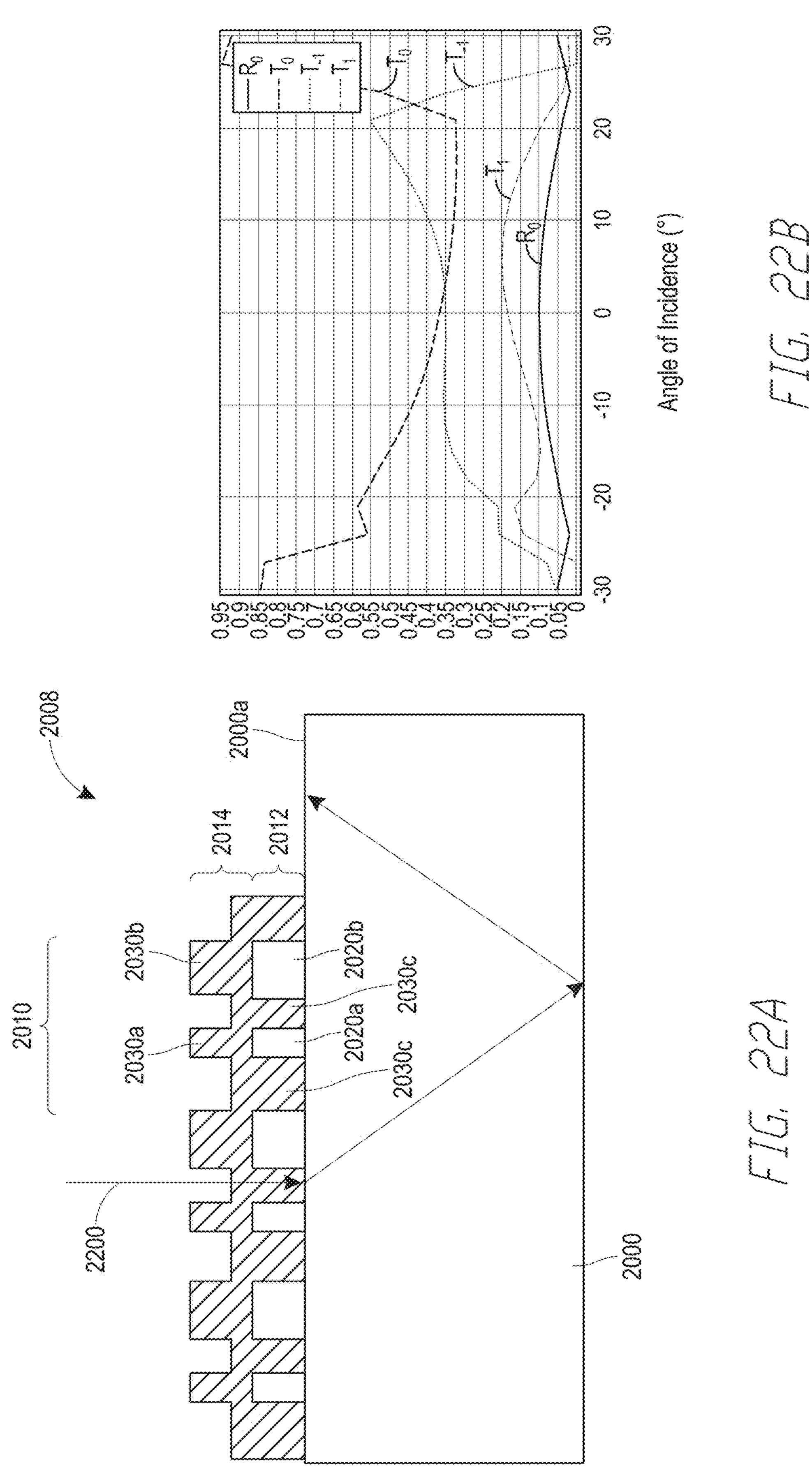
FIG. 22A illustrates an example of a cross-sectional side view of a multilevel metasurface.
FIG. 22B illustrates an example of a plot of transmission and reflection as a function of the angle of incidence of light for an optical structure having the general structure shown in FIG. 22A.

With continued reference to FIG. 22B, the percentage of light incident on the metasurface 2008 that is reflected and undergoes first order diffraction to angles suitable for TIR ($R_1$) is about 25% for an incident angle of 0°, and varies between 25% and 42% for incident angles from about −10° to about 10°. As illustrated, zero order reflection is advantageously low. Where the metasurface 2008 is utilized in a display device such as a display system 250 (FIG. 6) that utilizes a reflective spatial light modulator, zero order reflection may undesirably cause reflection of light back to the spatial light modulator, which then reflects the light back to the viewer, thereby causing undesirable image artifacts such as ghosting. Consequently, a low amount zero order reflection may be desirable in such applications. In addition, as illustrated, a portion of the incident light is transmitted ($T_0$) and another portion of the incident light undergoes negative first order diffraction ($R_{-1}$).

With reference now to FIG. 22A, a metasurface 2008 operating in the transmissive mode is illustrated. Notably, in this embodiment, the metasurface 2008 is similar to that shown in FIG. 21A, except for the heights of the features 2030*a*, 2030*b*, 2030*c*, and optionally the material forming these features 2030*a*, 2030*b*, 2030*c*. As illustrated, the heights of the masses 2030*c* (and the corresponding heights of the nanobeams 2030*a*, 2030*b*) may be greater than the heights of the nanobeams 2020*a*, 2020*b* in some embodiments. In the illustrated embodiment, the light ray 2200 propagates through the metasurface 2008 and is diffracted into an angle such that it propagates through the substrate 2000 by total internal reflection.

With reference now to FIG. 22B, an example is illustrated of a plot of transmission and reflection as a function of the angle of incidence of light for a metasurface having the general structure shown in FIG. 22A. As above, diffraction orders of transmitted and reflected light are indicated by "T" and "R," respectively. For each unit cell, the width of the nanobeam 2020*a* is 50 nm; the width of the nanobeam 2020*b* is 110 nm; the gap between the nanobeams 2020*a* and 2020*b* is 50 nm; the heights of the nanobeams 2020*a*, 2020*b* are 150 nm; the heights of the features 2030*a*, 2030*b*, 2030*c* are 190 nm; and the pitch of the unit cells 2010 is 382 nm. In this example, the nanobeams 2020*a*, 2020*b* are formed of an optically transmissive resist and the features 2030*a*, 2030*b*, 2030*c* are formed of silicon nitride, which has a refractive index of 2.0.

With continued reference to FIG. 22B, the percentage of light incident on the metasurface that is transmitted and undergoes negative first order diffraction to angles suitable for TIR ($T_{-1}$) is about 35% for an incident angle of 0°, and varies between 35% and 56% for incident angles from about −10° to about 10°. Zero order reflection remains advantageously low. As also illustrated, a portion of the incident light is transmitted ($T_0$) without being redirected, and another portion of the incident light undergoes positive first order diffraction ($T_1$).

With reference now to FIGS. 23A-23D, an example of a process flow for forming the metasurface 2008 is illustrated. With reference to FIG. 14A, a layer 2020 of a first material, e.g., resist (such as a nanoimoprint resist) is deposited on substrate 2000. The layer 2020 is preferably optically transmissive and may be deposited by, e.g., spin coating. In some embodiments, the layer 2020 may be deposited by jet coating (e.g., inkjet printing), which may provide advantages for forming exceptionally thin layers, and also layers with varying composition and/or thickness.

Figures 23A, 23B, 23C, 23D:
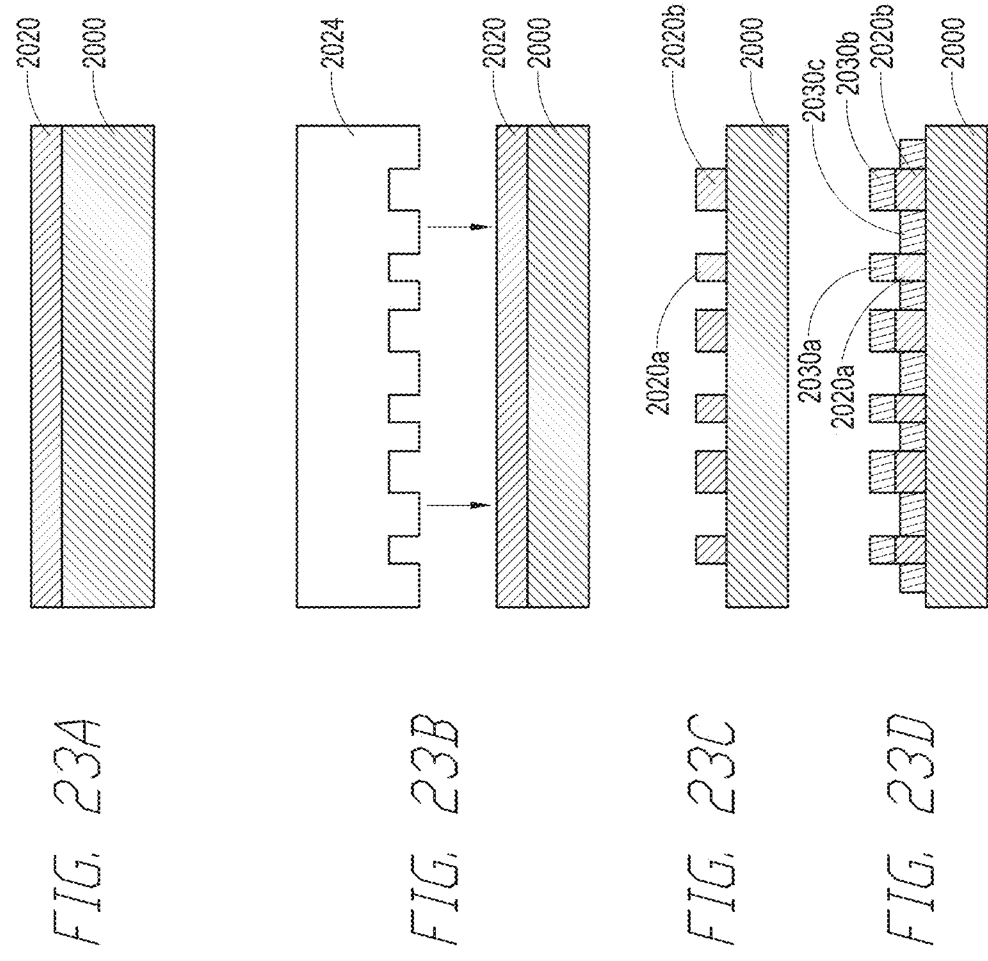
FIGS. 23A-23D illustrate an example of a process flow for forming multilevel metasurfaces.

With reference to FIG. 23B, an imprint template or master 2024 is brought into contact with the resist layer 2020 to pattern that layer. It will be appreciated that the pattern in the imprint template 2024 may be a negative of the pattern of nanobeams of the metasurface to be formed. The pattern in the imprint template 2024 may be formed by, e.g., lithography, including e-beam lithography or EUV lithography. Advantageously, the same template 2024 may be reused to pattern resist on multiple substrates, thereby reducing per-unit fabrication costs for the eventually-formed metasurfaces.

After contacting the imprint template 2024, the resist 2020 assumes the pattern defined by the openings in the template 2024. In some embodiments, the resist 2020 may be cured, e.g., by exposure to light (such as UV light) and/or heat, to immobilize the resist. The template 2024 may then be retracted, to leave a patterned resist having nanobeams 2020*a*, 2020*b*, as shown in FIG. 23C. In some other embodiments, the pattern in the resist layer may be transferred to an underlying layer of material (e.g., as shown in FIGS. 15A-15E) and the resist may be removed, thereby forming the nanobeams 2020*a*, 2020*b* in that underlying layer of material.

With reference now to FIG. 23D, a second material is subsequently deposited on the nanobeams 2020*a*, 2020*b* to form the nanobeams 2030*a*, 2030*b*. Examples of materials for the second material include semiconductor materials, including silicon-containing materials such as silicon, silicon nitride, silicon carbide; oxides, including zirconium oxide, zinc oxide, and titanium oxide; and optically transmissive resists. As disclosed herein, the second material 2030 is preferably an optically transmissive material. The second material 2030 may be deposited by various processes, including blanket depositions, directional depositions, and spin or jet coating. Examples of blanket depositions include chemical vapor deposition (CVD), in which the resist is exposed to mutually reactive precursors simultaneously present in a deposition chamber containing the substrate 2000, and atomic layer deposition (ALD), in which the resist is alternately exposed to precursors. ALD may provide advantages for precisely controlling the thickness of deposited layers, where high precision is desired, and also for depositing materials at low temperatures. Examples of directional depositions include evaporation and sputtering to deliver the second material preferentially onto the top surfaces of the nanobeams 2020*a*, 2020*b* and the substrate 2000.

It will be appreciated that substrates 2000 having metasurfaces according to various embodiments disclosed herein may be used to form display systems, such as the system 1000 (FIG. 6) disclosed herein. For example, the metasurfaces may be utilized as incoupling and/or outcoupling optical elements as noted herein. In some embodiments, after fabrication of the metasurface, the waveguide 2000 may be optically coupled to a light pipe, such as a light pipe for injecting image information into the waveguide. The light pipe may be an optical fiber in some embodiments. Examples of light pipes include the image injection devices 200, 202, 204, 206, 208 (FIG. 6) and scanning optical fibers. In some embodiments, a plurality of waveguides each having metasurfaces 2010 may be provided, and each of these waveguides may be optically coupled to one or more image injection devices.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while advantageously utilized with AR displays that provide images across multiple depth planes, the augmented reality content disclosed herein may also be displayed by systems that provide images on a single depth plane, and/or with virtual reality displays. In some embodiments where multiplexed image information (e.g. light of different colors) is directed into a waveguide, multiple metasurfaces may be provided on the waveguide, e.g., one metasurface active for each color of light. In some embodiments, the pitch or periodicity, and/or geometric sizes, of the nanobeams, or nanobeams, forming the metasurface may vary across a metasurface. Such a metasurface may be active in redirecting light of different wavelengths, depending upon the geometries and pitches at the locations where that light impinges on the metasurfaces. In some other embodiments, the geometries and pitches of metasurface features are configured to vary such that deflected light rays, even of similar wavelengths, propagate away from the metasurface at different angles. It will also be appreciated that multiple separated metasurfaces may be disposed across a substrate surface, with each of the metasurfaces having the same geometries and pitches in some embodiments, or with at least some of the metasurfaces having different geometries and/or pitches from other metasurfaces in some other embodiments.

Various terms specifying orientation are utilized herein. For example, the nanobeams may be described as being on or over a substrate, and may be described as having a height (or thickness). It will be appreciated that these terms relate to the nanobeams and substrate when placed in a reference orientation in which the substrate is vertically below the nanobeams. In such an orientation, a height describes a vertical dimension, while a gap, pitch, or width describe a lateral dimension, e.g., extending in a plane facing (e.g., substantially parallel to) the surface of the substrate on which the nanobeams are disposed. It will be appreciated, however, that the nanobeams and substrates are not limited in their relative orientations and may be positioned in other orientations relative to one another.

Also, while advantageously applied to displays, such as wearable displays, the metasurfaces may be applied to various other devices in which a compact, low-profile light redirecting element is desired. For example, the metal surfaces may be applied to form light redirecting parts of optical plates (e.g., glass plates), optical fibers, microscopes, sensors, watches, cameras, and image projection devices generally.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

For ease of description, various words indicating the relative positions of features are used herein. For example, various features may be described as being "on," "over," at the "side" of, "higher" or "lower" other features. Other words of relative position may also be used. All such words of relative position assume that the aggregate structure or system formed by the features as a whole is in a certain orientation as a point of reference for description purposes, but it will be appreciated that, in use, the structure may be positioned sideways, flipped, or in any number of other orientations.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. An optical system comprising:

a stack of optically transmissive substrates, wherein each optically transmissive substrate of the stack is a waveguide plate, wherein each of the optically transmissive substrates comprises a multilevel metasurface, the multilevel metasurface comprising:

a grating comprising a plurality of multilevel unit cells, each unit cell comprising, as seen in a top-down view:

on a lowermost level of the unit cell:

a laterally-elongated, first lowermost level nanobeam having a first width; and a laterally-elongated, second lowermost level nanobeam having a second width, wherein the second width is larger than the first width; and on an uppermost level of the unit cell:

a laterally-elongated, first uppermost level nanobeam above the first lowermost level nanobeam; and a laterally-elongated, second uppermost level nanobeam above the second lowermost level nanobeam, wherein dimensions of features of the unit cells varies between the substrates, wherein the metasurface is an incoupling optical element, further comprising an image injection device configured to project light to the incoupling optical element, wherein the metasurface is configured to redirect the light to propagate the light through the substrate by total internal reflection.

2. The optical system of claim 1, wherein the first and second uppermost level nanobeams comprise a different material from the first and second lowermost level nanobeams.

3. The optical system of claim 1, wherein the first and second lowermost level nanobeams comprise photoresist.

4. The optical system of claim 3, wherein the first and second lowermost level nanobeams comprise silicon.

5. The optical system of claim 4, wherein the first and second lowermost level nanobeams comprise silicon nitride.

6. The optical system of claim 3, wherein the first and second lowermost level nanobeams comprise an oxide.

7. The optical system of claim 6, wherein the first and second lowermost level nanobeams comprise titanium oxide.

8. The optical system of claim 1, wherein the first and second lowermost level nanobeams of the plurality of unit cells extend parallel to each other.

9. The optical system of claim 1, wherein the first width is 10 nm to 250 nm.

10. The optical system of claim 9, wherein the second width is 10 nm to 300 nm.

11. The optical system of claim 1, wherein a pitch of the unit cells is 300 nm to 500 nm.

12. The optical system of claim 1, wherein the first nanobeam and the second nanobeam are separated by a gap of 10 nm to 300 nm.

13. The optical system of claim 1, wherein the optically transmissive substrate and the metasurface form a polarizing beam splitter.

14. The optical system of claim 1, further comprising an outcoupling optical element comprising an outcoupling multilevel metasurface configured to extract light out of the substrate.

15. The optical system of claim 1, wherein the grating is embedded in an optically transmissive material.

* * * * *